(12) United States Patent
Sankrithi

(10) Patent No.: US 8,127,760 B2
(45) Date of Patent: Mar. 6, 2012

(54) LOW-COST HELIOSTATIC MIRROR WITH PROTECTIVE INFLATION STABILIZABLE SURFACE ELEMENT MEANS

(75) Inventor: Mithra M. K. V. Sankrithi, Lake Forest Park, WA (US)

(73) Assignee: RIC Enterprises, Mountlake Terrace, WA (US)

( * ) Notice: Subject to any disclaimer, the term of this patent is extended or adjusted under 35 U.S.C. 154(b) by 446 days.

(21) Appl. No.: 12/384,220

(22) Filed: Apr. 2, 2009

(65) Prior Publication Data

US 2010/0252027 A1 Oct. 7, 2010

(51) Int. Cl.
*F24J 2/32* (2006.01)
(52) U.S. Cl. ............................................. 126/697; 353/3
(58) Field of Classification Search ....... 359/3; 353/853; 126/684–691, 697
See application file for complete search history.

(56) References Cited

U.S. PATENT DOCUMENTS

| | | | | |
|---|---|---|---|---|
| 4,432,342 A * | 2/1984 | Lucas et al. | ............. | 126/570 |
| 4,762,298 A * | 8/1988 | Wood | ............. | 248/179.1 |
| 5,016,998 A * | 5/1991 | Butler et al. | ............. | 359/847 |
| 5,404,868 A * | 4/1995 | Sankrithi | ............. | 126/604 |
| 6,897,832 B2 * | 5/2005 | Essig et al. | ............. | 343/912 |
| 7,382,332 B2 * | 6/2008 | Essig et al. | ............. | 343/878 |
| 7,612,735 B2 * | 11/2009 | Essig et al. | ............. | 343/915 |
| 7,997,264 B2 * | 8/2011 | Sankrithi | ............. | 126/697 |
| 2005/0103329 A1 * | 5/2005 | Essig et al. | ............. | 126/697 |
| 2006/0033674 A1 * | 2/2006 | Essig et al. | ............. | 343/912 |
| 2009/0183730 A1 * | 7/2009 | Knight | ............. | 126/578 |
| 2011/0162637 A1 * | 7/2011 | Hahn | ............. | 126/600 |
| 2011/0277815 A1 * | 11/2011 | Sankrithi | ............. | 136/246 |

* cited by examiner

*Primary Examiner* — Alessandro Amari
*Assistant Examiner* — Jennifer L. Doak

(57) ABSTRACT

Increased utilization of solar power is highly desirable as solar power is a readily available renewable resource with power potential far exceeding total global needs; and as solar power does not contribute to environmentally harmful pollutants associated with fossil fuel power, such as unburned hydrocarbons, NOx and carbon dioxide. The present invention is motivated by the fact that heliostats are the single biggest cost element for utility-scale central receiver solar thermal powerplants. This invention provides a low-cost heliostatic mirror with protective inflation stabilizable surface element means for providing adverse weather performance & survival, where the inflation stabilizable surface element means include inflation stabilizable near-spherical surface element means and may include inflation stabilizable near-cylindrical surface element means.

20 Claims, 14 Drawing Sheets

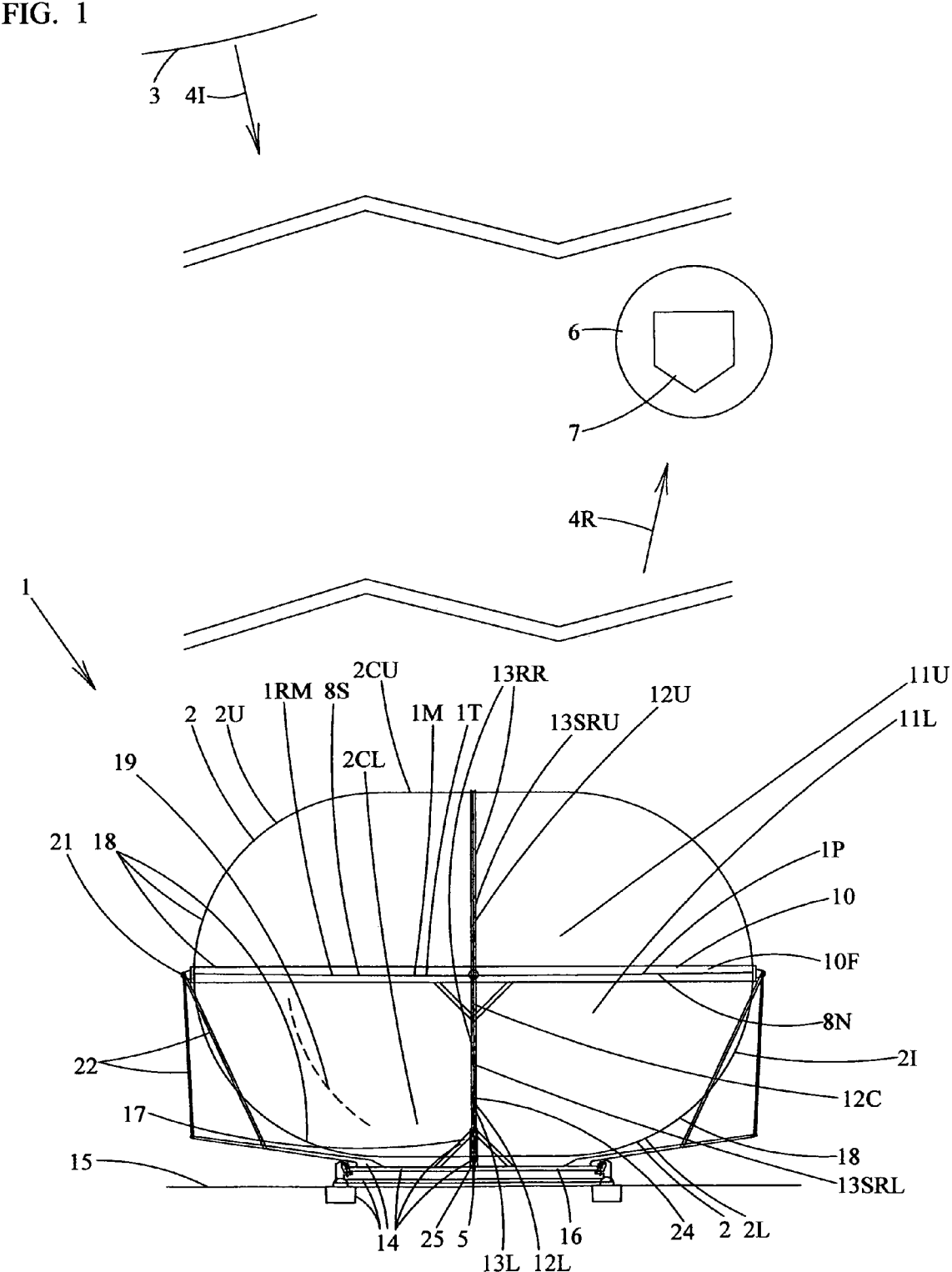

LOW-COST HELIOSTATIC MIRROR WITH PROTECTIVE INFLATION STABILIZABLE SURFACE ELEMENT MEANS

BACKGROUND OF THE INVENTION

Increased utilization of solar power is highly desirable as solar power is a readily available renewable resource with power potential far exceeding total global needs; and as solar power does not contribute to environment-damaging pollutants associated with fossil fuel power, such as unburned hydrocarbons, NOx and carbon dioxide. Solar powerplants produce no carbon dioxide that contributes as a greenhouse gas to global warming-in sharp contrast to fossil fuel powerplants such as coal, oil, or even natural gas powerplants. Limitations to the widespread deployment of solar power, either solar thermal power or solar photovoltaic power, have largely been a consequence of higher power cost per kilowatt-hour for traditional solar power systems as compared with fossil fuel power systems, driven in large part by the production and deployment costs of these solar power systems.

As an enabler for low cost solar power, it is of great importance to reduce the cost of heliostats, which are the devices that track the Sun's apparent motion and the single biggest cost component for central receiver or "power tower" utility-scale solar thermal powerplants. The idea of using inflatable heliostats, was proposed in the pioneering U.S. Pat. No. 5,404,868 entitled "Apparatus Using a Balloon Supported Reflective Surface for Reflecting Light from the Sun," cited below as Reference 1; and was prototyped and proof-of-concept tested in Reference 2.

OBJECTS OF THE INVENTION

It is an object of the invention to provide a low-cost heliostatic mirror that can be used beneficially in central receiver solar powerplants, such as "power tower" type solar thermal powerplants.

It is an object of the invention to provide a light weight heliostatic mirror that can be used beneficially in central receiver solar powerplants, such as "power tower" type solar thermal powerplants.

It is an object of the invention to beneficially utilize inflation stabilized substantially air impermeable membranous members in conjunction with a few substantially rigid support / framing members, to enable lighter weight and lower cost heliostatic mirror components that can meet load and environmental requirements and objectives.

It is an object of the invention to provide an adverse weather tolerant heliostatic mirror that can be used beneficially in central receiver solar powerplants, such as "power tower" type solar thermal powerplants.

It is an object of the invention to provide a low-cost heliostatic mirror with protective inflation stabilizable surface element means for providing adverse weather performance & severe adverse weather survival.

BRIEF SUMMARY OF THE INVENTION

The present invention provides further inventive development of inflatable heliostat technology with added novelty. Preferred embodiments use a sunlight-reflecting surface or membrane "sandwiched" between two inflated chambers, for reflecting incident sunlight to form a reflected sunlight beam aimable by heliostatic control means, towards a central solar power receiver at a target region.

More specifically, this invention provides a low-cost heliostatic mirror with protective inflation stabilizable surface element means for providing adverse weather performance & survival, where the inflation stabilizable surface element means include inflation stabilizable near-spherical surface element means and may include inflation stabilizable near-cylindrical surface element means.

A more detailed understanding of novel inventive features of the invention will become evident from a full consideration of the Specification including the Detailed Description, Figures and Claims.

BRIEF DESCRIPTION OF THE DRAWINGS

FIG. 1 shows a front view of a preferred embodiment of the invention.

DETAILED DESCRIPTION

Figure 2A:
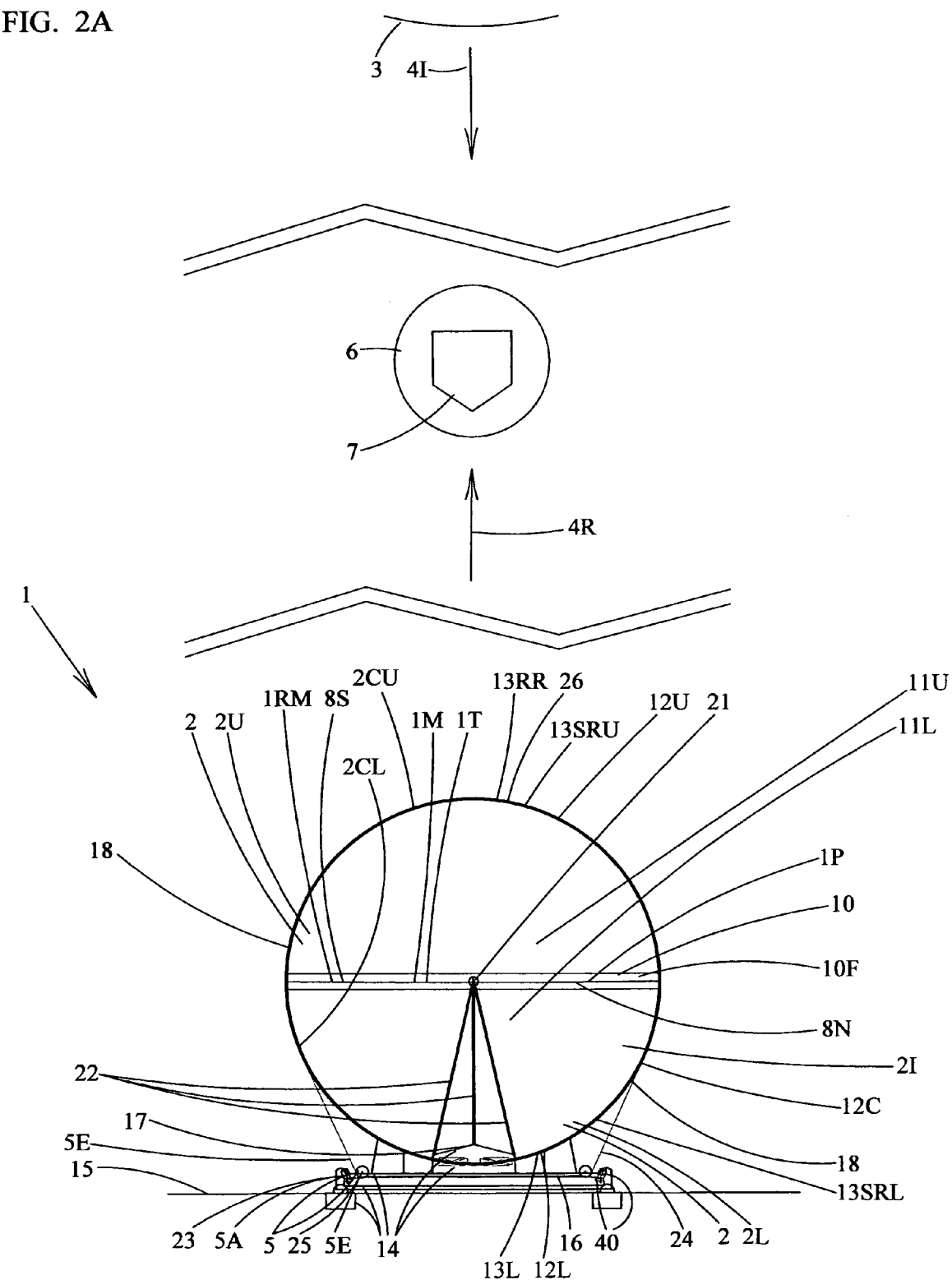
FIG. 2A shows an end view of the embodiment of FIG. 1.

The following presents a detailed description of the invention with reference to certain preferred embodiments, without precluding still other embodiments within the spirit and scope of the invention as defined in the following claims.

To better understand the detailed description, it is beneficial to define the meanings of certain terms, phrases and expressions.

The term or phrase "near-spherical" with reference to an envelope or surface geometry, is to be understood to mean an envelope or surface geometry that lies entirely within a volume defined by a true sphere's surface and regions within a 25% diameter distance of said true sphere's surface.

The term or phrase "near-cylindrical" with reference to an envelope or surface geometry, is to be understood to mean an envelope or surface geometry that lies entirely within a volume defined by a true cylinder's surface and regions within a 25% diameter distance of said true cylinder's surface.

The term or phrase "near-toroidal" with reference to an envelope or surface geometry, is to be understood to mean an envelope or surface geometry that lies entirely within a volume defined by a true toroid's surface and regions within a 25% diameter distance of said true toroid's surface.

The expression "winds below a 1$^{st}$ threshold level" refers to winds with a magnitude of wind velocity or wind speed that is below a level of severity that is called the 1$^{st}$ threshold level.

The 1$^{st}$ threshold level may have a value for winds and/or gusts corresponding to an absolute level of severity such as one of the following standard Beaufort wind levels or a specific speed within that Beaufort wind level (number and name listed):

| Beaufort wind name | Beaufort wind level | Speed in knots |
|---|---|---|
| Light breeze | 2 | 4-6 |
| Gentle breeze | 3 | 7-10 |
| Moderate breeze | 4 | 11-16 |
| Fresh breeze | 5 | 17-21 |
| Strong breeze | 6 | 22-27 |
| Near gale | 7 | 28-33 |
| Gale | 8 | 34-40 |
| Strong gale | 9 | 41-47 |
| Storm | 10 | 48-55 |
| Violent storm | 11 | 56-63 |

Alternatively, the 1$^{st}$ threshold level may have a value for winds and/or gusts corresponding to a relative level of severity such as having a probability of occurrence of less than some probability $p_1$. Representative but not limiting values of $p_1$ may be between 0.001 (or 0.1 %) and 0.1 (or 10%).

The expression "severe winds below a 2$^{nd}$ threshold level" refers to severe winds with a magnitude of wind velocity or wind speed that is below a level of severity that is called the 2$^{nd}$ threshold level.

The 2$^{nd}$ threshold level may have a value for winds and/or gusts corresponding to an absolute level of severity that is by definition higher than the 1$^{st}$ threshold level, such as one of the following standard Beaufort wind levels or a specific speed within that Beaufort wind level (number and name listed):

| Beaufort wind name | Beaufort wind level | Speed in knots |
|---|---|---|
| Gentle breeze | 3 | 7-10 |
| Moderate breeze | 4 | 11-16 |
| Fresh breeze | 5 | 17-21 |
| Strong breeze | 6 | 22-27 |
| Near gale | 7 | 28-33 |
| Gale | 8 | 34-40 |
| Strong gale | 9 | 41-47 |
| Storm | 10 | 48-55 |
| Violent storm | 11 | 56-63 |
| Hurricane | 12 | 64+ |

Alternatively, the 2$^{nd}$ threshold level may have a value for winds and/or gusts corresponding to a relative level of severity such as having a probability of occurrence of less than some probability $p_2$. Representative but not limiting values of $p_2$ may be between 0.000001 (or 0.0001%) and 0.01 (or 1%).

The expression "serious frozen precipitation below a 3$^{rd}$ threshold level" refers to serious frozen precipitation such as severe hail, hail, sleet, frozen rain, and/or snow, with the 3$^{rd}$ threshold level referring to at least one of: (i) an absolute level of pounds of frozen precipitation per unit time per unit area, (ii) a probabilistic relative level of pounds of frozen precipitation per unit time per unit area, (iii) an absolute level of hailstone weight and volume for hailstorm survival, (iv) a probabilistic relative level of hailstone weight and volume for hailstorm survival, and (v) another absolute measure, and (vi) another probabilistic relative measure.

The expression "significant sandstorm particles below a 4$^{th}$ threshold level" refers to significant sandstorms, with the 4$^{th}$ threshold level referring to at least one of: (i) an absolute level of pounds of sand particles per unit time per unit area, (ii) a probabilistic relative level of pounds of sand particles per unit time per unit area, (iii) an absolute level of sand velocity for sandstorm survival, (iv) a probabilistic relative level of sand velocity for sandstorm survival, and (v) another absolute measure, and (vi) another probabilistic relative measure The following presents a detailed description of the invention with reference to the attached Figures.

FIG. 1 shows a side view of a preferred embodiment of the invention, with a low-cost heliostatic mirror I that reflects incident sunlight 4I from the Sun 3, to form a reflected sunlight beam 4R going to a target region 6 at which a solar receiver 7 can be located. While a mirror 1M is shown that is slightly upwardly concave, it is to be understood that a substantially planar mirror can also be used within the spirit and scope of the invention as claimed. The invention can also be made in small, medium or large scales, ranging in the extreme from millimeter to meter to kilometer scales.

In typical central receiver solar thermal powerplant applications, it will be understood that typically a large number of low-cost heliostatic mirrors distributed over an expanse of ground surface, will all be appropriately aimed by control means so as to reflect sunlight onto a common solar receiver at a target region that is typically elevated above the ground surface. The preferred solar receiver is a solar thermal receiver, but alternate embodiments using a cooled central photovoltaic receiver are also possible. A variety of solar receiver configurations and designs known from the prior art could be used, and the solar power collected by the solar receiver can be used for electric power generation by a thermodynamic cycle engine driving an electric generator, and/or to provide heat for beneficial uses such as industrial process heat, building heat, water heating, or heat storage (e.g., in a molten salt working fluid) for later (e.g., night-time) conversion to electric power. The thermodynamic cycle engine may use a Rankine (steam engine type) cycle, Brayton (jet engine type) cycle, Stirling cycle, Diesel cycle, Otto cycle, Carnot cycle, and/or other thermodynamic cycle.

More specifically, FIG. 1 shows:

a low-cost heliostatic mirror 1 with inflation stabilizable surface element means 2 for providing adverse weather performance & survival, comprising:

a mirror 1M comprising thin reflective surface means 1T for reflecting incident sunlight 4I when the Sun 3 is shining and visible;

heliostatic control means 5 for angular pointing of said mirror 1M so as to cause said mirror 1M to reflect said incident sunlight 4I to form a reflected sunlight beam 4R going to a target region 6 at which a solar receiver 7 can be located;

perimeter support means 10 for accurately setting and holding the perimeter of said thin reflective surface means 1T in a desired orientation as commanded by said heliostatic control means 5;

inflation stabilizable surface element means 2 for enhancing adverse weather performance & survival for said mirror 1M, which inflation stabilizable surface element means 2 include substantially transparent upper inflation stabilizable near-spherical surface element means 2U located above an upper inflatable volume 11U above the sunlight reflecting sunward side of said mirror 8S, and lower inflation stabilizable near-spherical surface element means 2L located below a lower inflatable volume 11L below the nonsunward side of said mirror 8N;

and connecting lower perimeter encircling means 12L and upper perimeter encircling means 12U for encircling the lower perimeter of said lower inflatable volume 11L and the upper perimeter of said upper inflatable volume 11U respectively, which connecting lower perimeter encircling means 12L and upper perimeter encircling means 12U form a near-circular closed loop 12C in circumferential tension when said lower inflated volume 11L and upper inflatable volume 11U are both fully inflated;

and wherein:

(a) said substantially transparent upper inflation stabilizable near-spherical surface element means 2U and lower inflation stabilizable near-spherical surface element means 2L together serve as means for enhancing adverse weather performance for said mirror I M under adverse weather conditions comprising winds below a $1^{st}$ threshold level, when said upper inflatable volume 11U and lower inflatable volume 11L are fully inflated;

and wherein:

(b) said lower inflation stabilizable near-spherical surface element means 2L serve as means for enhancing adverse weather survival for said mirror 1M in a stowed survival configuration [stowed survival configuration for this embodiment is not visible in FIG. 1, but is illustrated subsequently in FIG. 4B and FIG. 7D], under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

Note that the heliostatic control means 5 may include elevation control means and azimuth control means; and may include one or more motors or stepper motors, may include loop means, a belt, a toothed belt, a belt with holes, a chain, a cable, a toothed cable, a concentric ring-bearing-connected member, gears, a computer and a microprocessor. It is presumed that well-known prior art design, analysis and optimization methods, tools and techniques, including loads analysis methods, finite element models for rigid and inflatable and flexible tension structural elements, stress sizing methods, allowables analyses, and translational and rotational deflection analyses, will be applied to optimize the engineering design of devices of this class, responsive to a set of driving requirements and objectives including heliostatic pointing accuracy, adverse weather performance and adverse weather survival.

FIG. 1 also shows:

a low-cost heliostatic mirror 1 with inflation stabilizable surface element means 2 for providing adverse weather performance & survival, comprising:

a mirror 1M comprising thin reflective surface means 1T for reflecting incident sunlight 4I when the Sun 3 is shining and visible;

heliostatic control means 5 for angular pointing of said mirror 1M so as to cause said mirror 1M to reflect said incident sunlight 4I to form a reflected sunlight beam 4R going to a target region 6 at which a solar receiver 7 can be located;

perimeter support means 10 for accurately setting and holding the perimeter of said thin reflective surface means 1T in a desired orientation as commanded by said heliostatic control means 5; and inflation stabilizable surface element means 2 for enhancing adverse weather performance & survival for said mirror 1M, which inflation stabilizable surface element means 2 include (i) substantially transparent upper inflation stabilizable near-spherical surface element means 2U on lateral sides of substantially transparent upper inflation stabilizable near-cylindrical surface element means 2CU all located above an upper inflatable volume 11U above the sunlight reflecting sunward side of said mirror 8S, and (ii) lower inflation stabilizable near-spherical surface element means 2L on lateral sides of lower inflation stabilizable near-cylindrical surface element means 2CL all located below a lower inflatable volume 11L below the nonsunward side of said mirror 8N;

and wherein:

said (i) substantially transparent upper inflation stabilizable near-spherical surface element means 2U on lateral sides of substantially transparent upper inflation stabilizable near-cylindrical surface element means 2CU and (ii) lower inflation stabilizable near-spherical surface element means 2L on lateral sides of lower inflation stabilizable near-cylindrical surface element means 2CL, all together serve as means for enhancing adverse weather performance for said mirror 1M under adverse weather conditions comprising winds below a $1^{st}$ threshold level, when said upper inflatable volume 11U and lower inflatable volume 11L are fully inflated;

and wherein:

said (ii) lower inflation stabilizable near-spherical surface element means 2L on lateral sides of lower inflation stabilizable near-cylindrical surface element means 2CL, together serve as means for enhancing adverse weather survival for said mirror 1M in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

FIG. 1 also shows:

a low-cost heliostatic mirror 1 with inflation stabilizable surface element means 2 for providing adverse weather performance & survival, comprising:

a mirror 1M comprising thin reflective surface means 1T for reflecting incident sunlight 4I when the Sun 3 is shining and visible;

heliostatic control means 5 for angular pointing of said mirror 1M so as to cause said mirror 1M to reflect said incident sunlight 4I to form a reflected sunlight beam 4R going to a target region 6 at which a solar receiver 7 can be located;

perimeter support means 10 for accurately setting and holding the perimeter of said thin reflective surface 1T means in a desired orientation as commanded by said heliostatic control means 5;

inflation stabilizable surface element means 2 for enhancing adverse weather performance & survival for said mirror 1M, which inflation stabilizable surface element means 2 include substantially transparent upper inflation stabilizable near-spherical surface element means 2U located above an upper inflatable volume 1U above the sunlight reflecting sunward side of said mirror 8S, and lower inflation stabilizable near-spherical surface element means 2L located below a lower inflatable volume 11L below the nonsunward side of said mirror 8N;

a lower perimeter member 13L of near-circular arc form that is structurally contiguous to (i) a lower perimeter of said lower inflatable volume 11L when said lower inflatable volume 11L is fully inflated and to (ii) said perimeter support means 10 at its upper ends;

and mirror support means 14 for supporting said mirror 1M on a ground surface 15 which mirror support means 14 includes a rotatable base member 16 and connecting support means 17 for connecting said lower perimeter member 13L to said rotatable base member 16;

and wherein:

(a) said substantially transparent upper inflation stabilizable near-spherical surface element means 2U and lower inflation stabilizable near-spherical surface element means 2L together serve as means for enhancing adverse weather performance for said mirror 1M under adverse weather conditions comprising winds below a $1^{st}$ threshold level, when said upper inflatable volume 11U and lower inflatable volume 11L are fully inflated;

and wherein:

(b) said lower inflation stabilizable near-spherical surface element means 2L serve as means for enhancing adverse weather survival for said mirror 1M in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

FIG. 1 also shows:

the low-cost heliostatic mirror 1, wherein:

said mirror 1M comprising thin reflective surface means 1T for reflecting incident sunlight 4I comprises a reflective membrane 1RM with an upper reflective surface, and wherein said perimeter support means 10 comprises at least one of a perimeter support frame 10F and a substantially rigid perimeter support ring 10R, with a perimeter support frame 10F shown in the illustrated preferred embodiment.

FIG. 1 also shows:

the low-cost heliostatic mirror of claim 1, wherein:

said inflation stabilizable surface element means 2 are connected to said perimeter support means 10, and wherein said inflation stabilizable surface element means 2 and said perimeter support means 10 together form a near-spherical envelope 18 surrounding said mirror 1M when said upper inflatable volume 11U and lower inflatable volume 11L are fully inflated, and wherein at least one of:

(i) said near-spherical envelope 18 has a surface geometry that lies entirely within a volume defined by a true sphere's surface 19 and regions within a 25% diameter distance of said true sphere's surface 19;

and (ii) said near-spherical envelope 18 has a surface geometry that serves as aerodynamic moment minimizing means for yielding relatively small aerodynamic moments responsive to wind applied from arbitrary angles on said surface geometry, wherein an aerodynamic moment is relatively small if the nondimensionalized aerodynamic moment coefficient per radian of angle of attack has a magnitude less than three halves.

Ref. 3, Hoerner's *Fluid Dynamic Lift*, p. 19-14, presents an equation for the nondimensionalized aerodynamic moment coefficient $C_m$ for a body of revolution with fineness ratio l/d (where fineness ratio is the length to diameter ratio of the body of revolution). The nondimensionalized aerodynamic moment coefficient is defined as the (dimensional) aerodynamic moment M divided by (dynamic pressure*volume of the body of revolution with fineness ratio l/d). The theoretical nondimensionalized aerodynamic moment coefficient $C_m$ for a body of revolution with fineness ratio l/d, is given by equation (16) on p. 19-14 as $C_m = -2 \, k\alpha$, where $k=(1-d/l)$. Correspondingly, the theoretical nondimensionalized aerodynamic moment coefficient per radian of angle of attack is $C_{m\alpha} = -2 \, k = -2(1-d/l)$, and has a magnitude $|C_{m\alpha}| = 2(1-d/l)$. Thus, clause (ii) state $|C_{m\alpha}| < 3/2$ which corresponds theoretically to $2(1-d/l) < 3/2$ or equivalently to fineness ratio l/d<4. Clause (i) similarly corresponds theoretically to fineness ratio l/d<3. Thus, clauses (i) and (ii) are both true for the preferred embodiment shown in FIG. 1, which has a fineness ratio r/d=3/2. Thus this preferred embodiment with its use of a near-spherical shape will be relatively moment-insensitive to winds coming from arbitrary directions, which will foster the achievement of light weight and low cost objectives for this preferred embodiment of the invention.

FIG. 1 also shows:

the low-cost heliostatic mirror 1, wherein said mirror support means 14 further comprises two substantially coaxial pivot bearings 21 connecting said perimeter support means 10 to pivot support members 22, wherein the lower ends of said pivot support members 22 are connected to and supported by said rotatable base member 16.

Note that the mirror 1M will rotate around an axis spanning between said substantially coaxial pivot bearings 21, as the heliostatic control means 5 for angular pointing of said mirror 1M changes the elevation angle of said mirror 1M.

FIG. 1 also shows:

the low-cost heliostatic mirror 1, wherein said inflation stabilizable surface element means 2 comprise substantially gas-impermeable membrane members 2I.

Technologies for the use of gas-impermeable membrane members 2I for inflated structures, have been developed in other field for balloons, blimps, inflated boats, etc, and can be adapted and applied here. Specific materials such as ETFE, polyethylene, vinyl, rubberized fabric, etc, can be utilized for transparent and nontransparent surfaces, balancing requirements and objectives for cost, weight, permeability minimization, impact resistance, abrasion resistance, load resistance, tear resistance etc.

FIG. 1 also shows:

the low-cost heliostatic mirror 1, wherein said lower perimeter member 13L of near-circular arc form comprises a substantially rigid lower perimeter member 13SR of approximately circular arc form, which substantially rigid lower perimeter member 13SRL of approximately circular arc form is structurally connected at its upper ends to the lower ends of a substantially rigid upper perimeter member 13SRU of approximately circular arc form, such that together they form a substantially rigid ring 13RR that surrounds an inflatable contiguous volume that includes both said lower inflatable volume 11L and said upper inflatable volume 11U; and wherein said connecting support means 17 connects to and supports and restrains said substantially rigid ring 13RR at least one of (i) vertically and (ii) laterally.

In the illustrated embodiment the connecting support means 17 connects to and supports and restrains said substantially rigid ring 13RR both (i) vertically and (ii) laterally.

FIG. 1 also shows:

the low-cost heliostatic mirror 1, wherein the lateral width of said substantially transparent upper inflation stabilizable near-cylindrical surface element means 2CU is less than two times the effective diameter of said substantially transparent upper inflation stabilizable near-spherical surface element means 2U; and wherein the lateral width of said lower inflation stabilizable near-cylindrical surface element means 2CL is less than two times the effective diameter of said lower inflation stabilizable near-spherical surface element means 2L.

In the illustrated embodiment the lateral width of said substantially transparent upper inflation stabilizable near-cylindrical surface element means 2CU is approximately half the effective diameter of said substantially transparent upper inflation stabilizable near-spherical surface element means 2U; and the lateral width of said lower inflation stabilizable near-cylindrical surface element means 2CL is also approximately half the effective diameter of said lower inflation stabilizable near-spherical surface element means 2L.

FIG. 1 also shows:
the low-cost heliostatic mirror 1, further comprising a lower perimeter member 13L of near-circular arc form that is structurally contiguous to (i) a lower perimeter of said lower inflatable volume 11L when said lower inflatable volume 11L is fully inflated and to (ii) said perimeter support means 10 at its upper ends; and mirror support means 14 for supporting said mirror 1M on a ground surface 15 which mirror support means 14 includes a rotatable base member 16 and connecting support means 17 for supporting said lower perimeter member 13L above said rotatable base member 16.

FIG. 1 also shows:
the low-cost heliostatic mirror 1, wherein said perimeter support means 10 comprises a perimeter support frame 10F, and wherein said perimeter support frame 10F supports edges of each of: said substantially transparent upper inflation stabilizable near-spherical surface element means 2U, said substantially transparent upper inflation stabilizable near-cylindrical surface element means 2CU, said lower inflation stabilizable near-spherical surface element means 2L, and said lower inflation stabilizable near-cylindrical surface element means 2CL.

FIG. 2A shows an end view of the embodiment of FIG. 1.

In addition to features of this embodiment that have been described with respect to FIG. 1, certain other features of this embodiment are more visible in FIG. 2 and will be described with respect to FIG. 2, as follows.

FIG. 2A shows:
the low-cost heliostatic mirror 1, wherein said heliostatic control means 5 for angular pointing of said mirror 1M includes both elevation control means 5E for controlling the elevation angle of said mirror 1M and azimuth control means 5A for controlling the azimuth angle of said mirror 1M; which elevation control means acts 5E on at least one of said perimeter support means 10 and said lower perimeter member 1 3L; and which azimuth control means 5A comprises rotational positioning means 23 for rotationally positioning said rotatable base member 16.

In the illustrated embodiment bearing-mounted rollers 40 are attached to the rotatable base member 16 and engage a circular support base 41 that is fixedly anchored in the ground by ground anchor means 42. It will be understood that in alternative embodiments the bearing-mounted rollers 40 may be attached by nonrotating structure such as truss means to the ground anchor means, and the circular support base 41 attached to or part of the rotatable base member 16. It will also be understood that various alternate geometries and configurations of bearing-mounted rollers and interfaces with the circular support base may be utilized based on the considerable prior art of rotation-permitting mechanisms and bearings, to provide appropriate vertical and lateral restraint load paths to the low-cost heliostatic mirror 1, while allowing azimuthal rotation that can be controlled by azimuth control means 5A. Ground anchor means 42 could comprise at least one of angled ground screws, angled ground stakes, vertical ground screws, vertical ground stakes, earth-engaging means, structural elements engaging concrete, structural elements into ground holes then filled with poured concrete, foundation means, ground plate with ballasting weight, float means on marsh/swamp/water surfaces above an underwater ground surface, ground-anchored tethers and other ground anchor means.

FIG. 2A also shows:
the low-cost heliostatic mirror 1, further comprising: loop means 24 comprising at least one of a belt, a toothed belt, a belt with holes, a chain, and a concentric ring-bearing-connected member, that loops around both (a) the upper part of said substantially rigid ring 13RR and (b) at least one roller element 25 connected to said rotatable base member 16; which loop means 24 serves as at least one of (i) vertical restraint means 26 for restraining said substantially rigid ring 13RR from upward vertical movement, and (ii) elevation control means 5E for contributing to the elevation control part of said heliostatic control means 5.

Figure 2B:
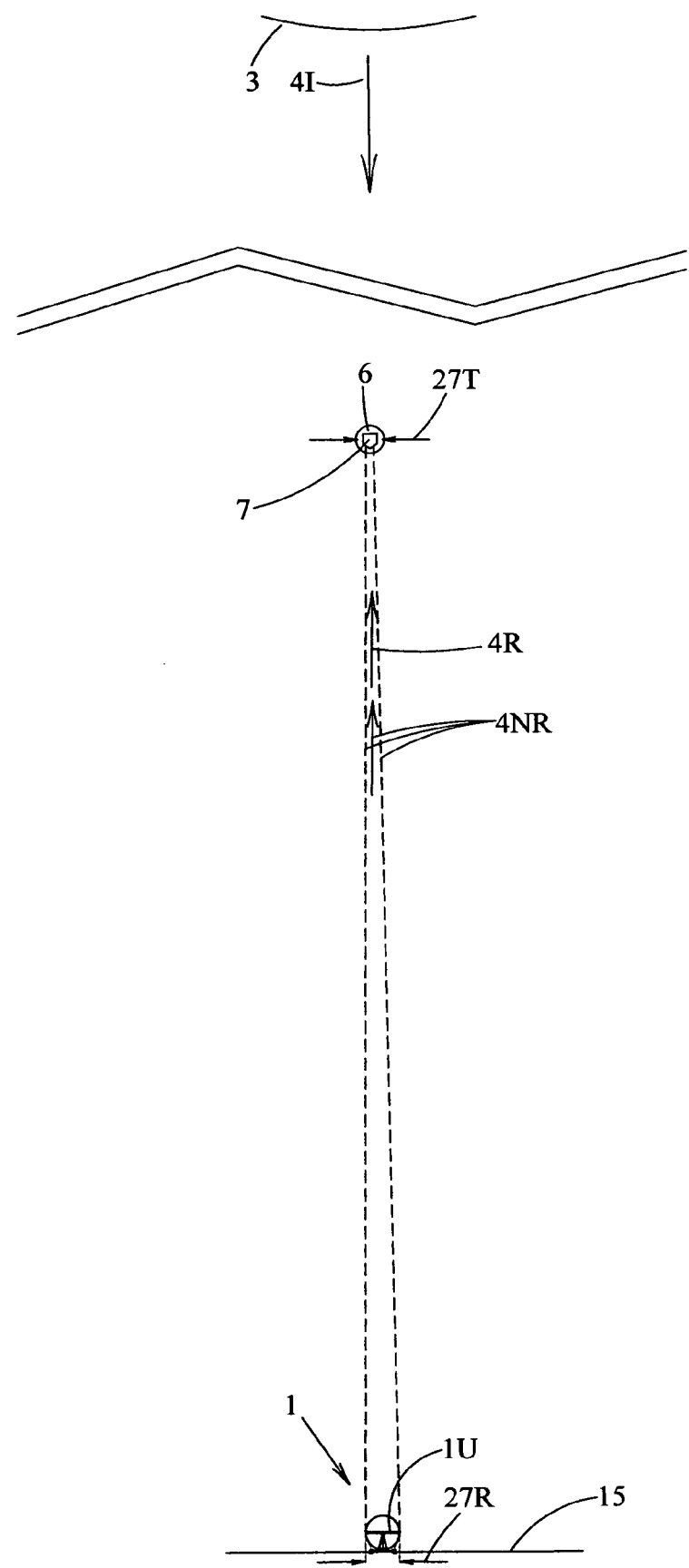
FIG. 2B shows a similar embodiment as FIG. 2A, from a much more distant viewpoint.

FIG. 2B shows a similar embodiment as FIG. 2A, from a much more distant viewpoint so that a target region 6 at which a solar receiver 7 can be located can be seen in the view without the view break jagged line between heliostatic mirror and the target region as shown earlier in FIG. 1 and FIG. 2A.

More specifically, FIG. 2B shows:
the low-cost heliostatic mirror 1, wherein said mirror 1M comprising thin reflective surface means 1T for reflecting incident sunlight 4I, comprises upwardly concave thin reflective surface means 1U for reflecting and concentrating said incident sunlight 4I to form reflected sunlight beam 4R that is a narrowing reflected sunlight beam 4NR, and wherein the target projected area 27T of said target region 6 that can receive said reflected sunlight beam 4R, is less than the projected reflective area 27R of said upwardly concave thin reflective surface means 1U.

FIG. 2B also shows:
The low-cost heliostatic mirror 1, wherein:
wherein said mirror 1M comprising thin reflective surface means 1T for reflecting incident sunlight 4I, comprises upwardly concave thin reflective surface means 1U for reflecting and concentrating said incident sunlight 4I to form a reflected sunlight beam 4R that is a narrowing reflected sunlight beam 4NR, wherein said upwardly concave thin reflective surface means 1U comprises an upwardly concave reflective membrane supported around its perimeter by said perimeter support means 10, which perimeter support means 10 comprises at least one of a perimeter support frame 10F and a substantially rigid perimeter support ring, and wherein the target projected area 27T of said target region 6 that can receive said reflected sunlight beam 4R, is less than the projected reflective area 27R of said upwardly concave thin reflective surface means 1U.

Figure 3A:
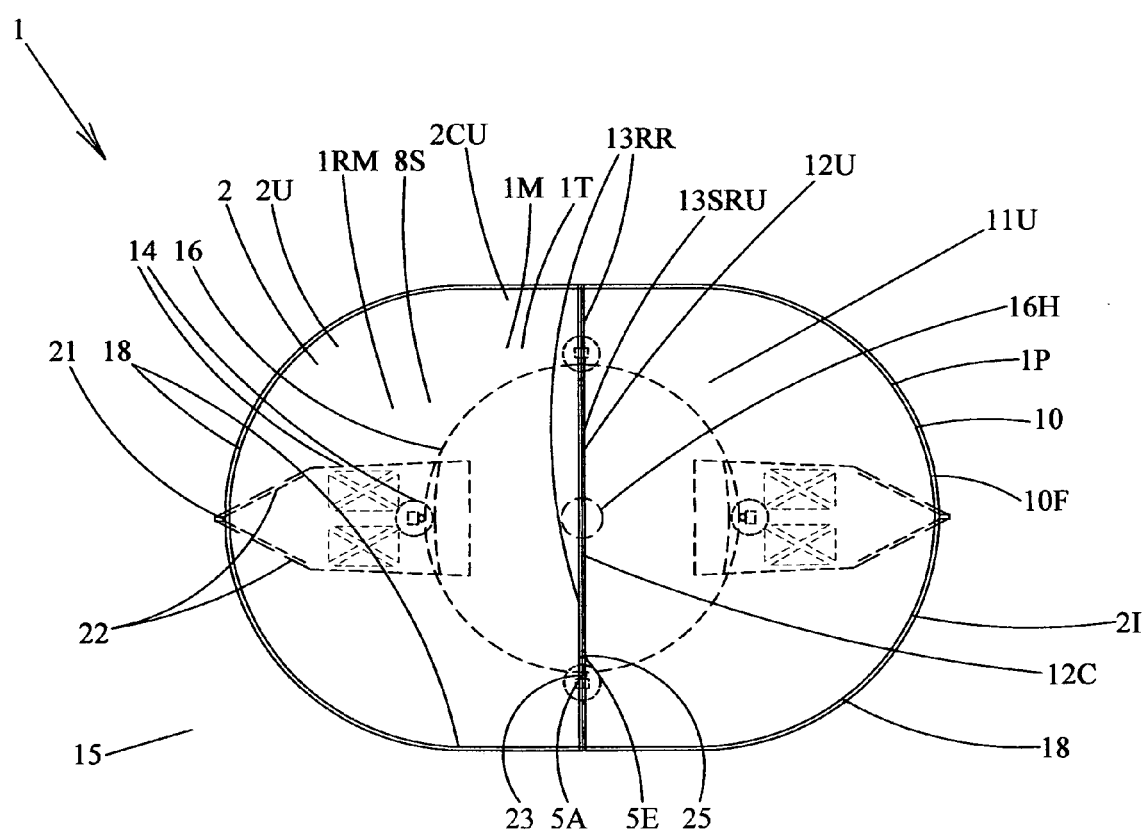
FIG. 3A shows a plan view of the embodiment of FIG. 1 and FIG. 2A.

FIG. 3A shows a plan view of the embodiment of FIG. 1 and FIG. 2A.

The view of FIG. 3A also shows a representative hole 16H in the rotatable base member 16, which may be provided as a lightening hole to reduce weight and cost, and/or as a drainage hole to allow water or other substances to drain from the upper surface of the rotatable base member 16. In various embodiments a plurality of holes of various sizes and shapes may be used, as is known from the prior art of substantially circular structures that carry loads, such as wheels of automobiles or bicycles for example, that may have holes in them or be constructed of framing or truss or spoke elements with many holes between them is an engineered arrangement.

Figure 3B:
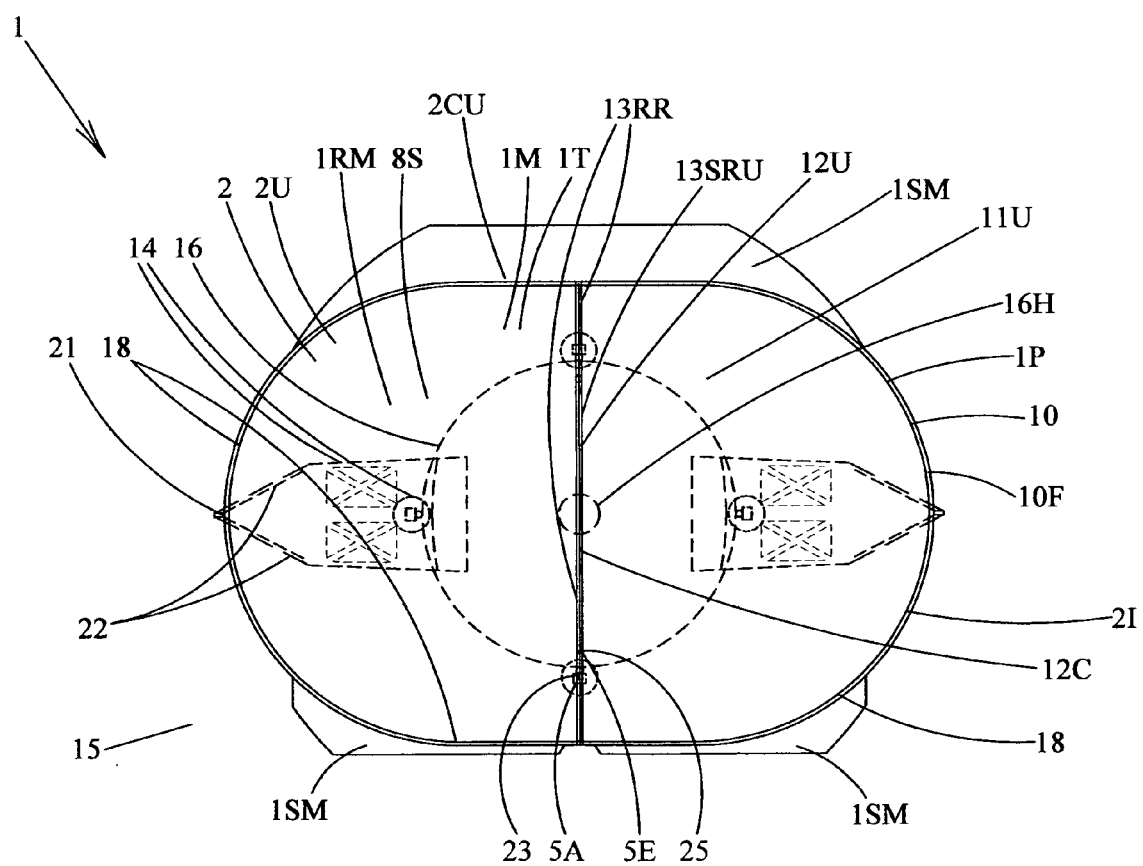
FIG. 3B shows another embodiment similar to that of FIG. 3A.

FIG. 3B shows an embodiment similar to that of FIG. 3A, but with the addition of one or more (three shown) supplementary mirror elements 1SM attachably or permanently structurally connected to and located outside the periphery of the perimeter support means 10 here comprising a perimeter support flame 10F. The illustrated, but not limiting, supplementary mirror elements are a single bigger upper supplementary mirror element, and two smaller lower supplementary mirror elements that can swing under the bottom of the inflatable volume when the elevation angle heliostatic control commands an inverted device elevation angle for an inverted stowed survival configuration to be achievable. The supplementary mirror elements 1SM will preferably be at least one of substantially planar and concave upward, and may be rigid structure backed mirrors, or framed membrane mirrors, without being limiting. The supplementary mirror elements 1SM will also preferably reflect incident sunlight to form a reflected sunlight beam going to the target region at which a solar receiver can be located. The supplementary mirror elements 1SM will also preferably have weather-resistant mirror surfaces that are easy to clean or self-cleaning, abrasion resistant and durable. Glass, acrylic or ETFE surfaces may be used, without being limiting. The supplementary mirror elements 1SM may optionally be fitted with drain holes or other drainage means so they don't collect precipitation.

Figure 4A:
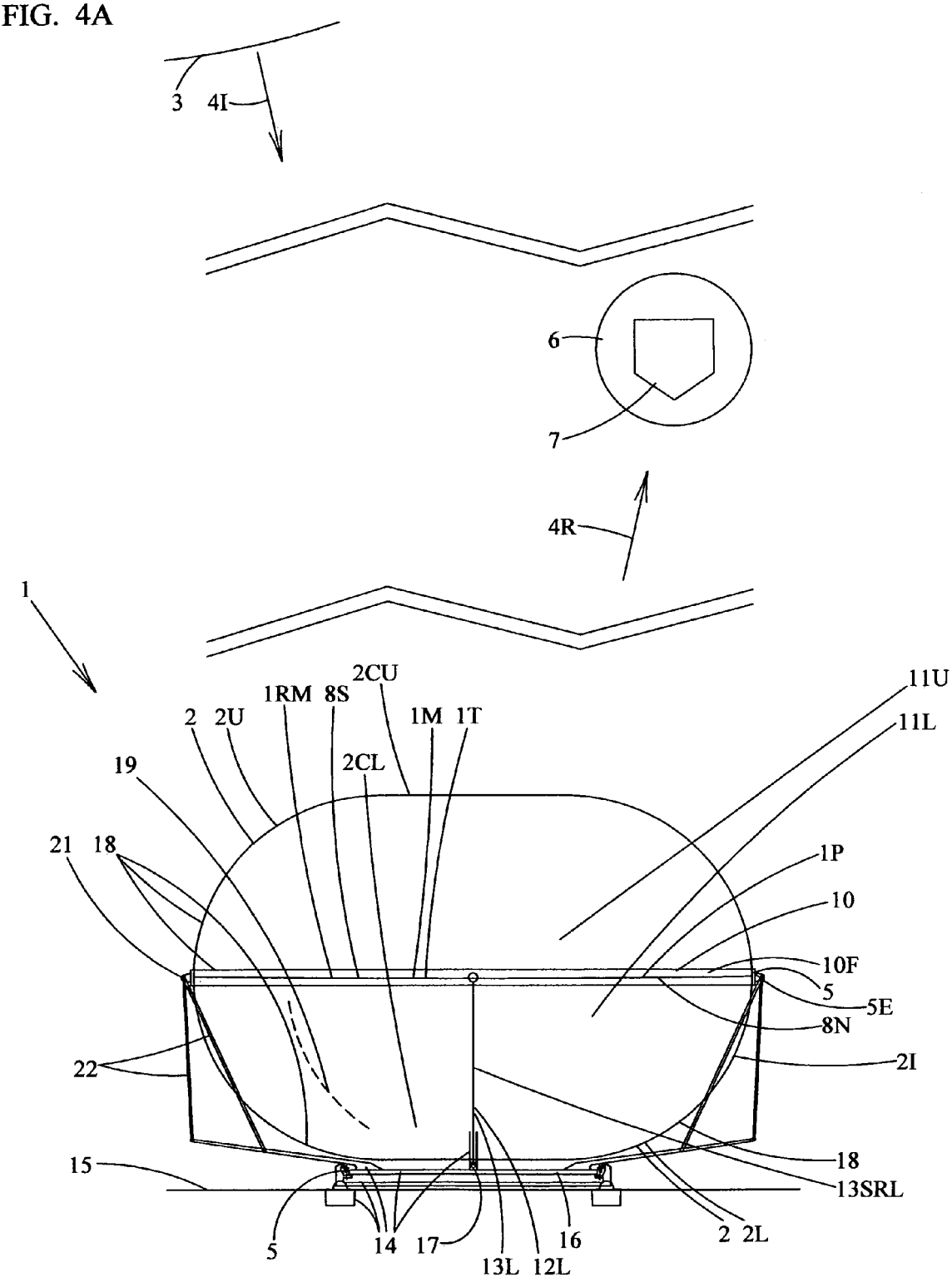
FIG. 4A shows a side view of another preferred embodiment.

FIG. 4A shows a side view of another preferred embodiment of the invention similar to the embodiment shown in FIG. 1 but not using upper perimeter encircling means 12U or substantially rigid upper perimeter member 13SRU. This can potentially reduce weight, cost and shadowing losses relative to the FIG. 1 embodiment, but with some corresponding reduction in device rigidity and extreme weather tolerance. The heliostatic control means 5 in this embodiment includes azimuth control means acting on the rotatable base member 16 and elevation control means acting around the pivot bearings 21.

Said elevation control means 5E acts on said perimeter support means 10 by rotationally orienting said perimeter support means 10 around said pivot bearings 21.

FIG. 4A shows a side view of a preferred embodiment of the invention, with a low-cost heliostatic mirror 1 that reflects incident sunlight 4I from the Sun 3, to form a reflected sunlight beam 4R going to a target region 6 at which a solar receiver 7 can be located.

FIG. 4A shows:
a low-cost heliostatic mirror 1 with inflation stabilizable surface element means 2 for providing adverse weather performance & survival, comprising:
a mirror 1M comprising thin reflective surface means 1T for reflecting incident sunlight 4I when the Sun 3 is shining and visible;
heliostatic control means 5 for angular pointing of said mirror 1M so as to cause said mirror 1M to reflect said incident sunlight 4I to form a reflected sunlight beam 4R going to a target region 6 at which a solar receiver 7 can be located;
perimeter support means 10 for accurately setting and holding the perimeter of said thin reflective surface 1T means in a desired orientation as commanded by said heliostatic control means 5;
inflation stabilizable surface element means 2 for enhancing adverse weather performance & survival for said mirror 1M, which inflation stabilizable surface element means 2 include substantially transparent upper inflation stabilizable near-spherical surface element means 2U located above an upper inflatable volume 11U above the sunlight reflecting sunward side of said mirror 8S, and lower inflation stabilizable near-spherical surface element means 2L located below a lower inflatable volume 11L below the nonsunward side of said mirror 8N;
a lower perimeter member 13L of near-circular arc form that is structurally contiguous to (i) a lower perimeter of said lower inflatable volume 11L when said lower inflatable volume 11L is fully inflated and to (ii) said perimeter support means 10 at its upper ends;
and mirror support means 14 for supporting said mirror 1M on a ground surface 15 which mirror support means 14 includes a rotatable base member 16 and connecting support means 17 for connecting said lower perimeter member 13L to said rotatable base member 16;
and wherein:
(a) said substantially transparent upper inflation stabilizable near-spherical surface element means 2U and lower inflation stabilizable near-spherical surface element means 2L together serve as means for enhancing adverse weather performance for said mirror 1M under adverse weather conditions comprising winds below a $1^{st}$ threshold level, when said upper inflatable volume 11U and lower inflatable volume 11L are fully inflated;
and wherein:
(b) said lower inflation stabilizable near-spherical surface element means 2L serve as means for enhancing adverse weather survival for said mirror 1M in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

Figure 4B:
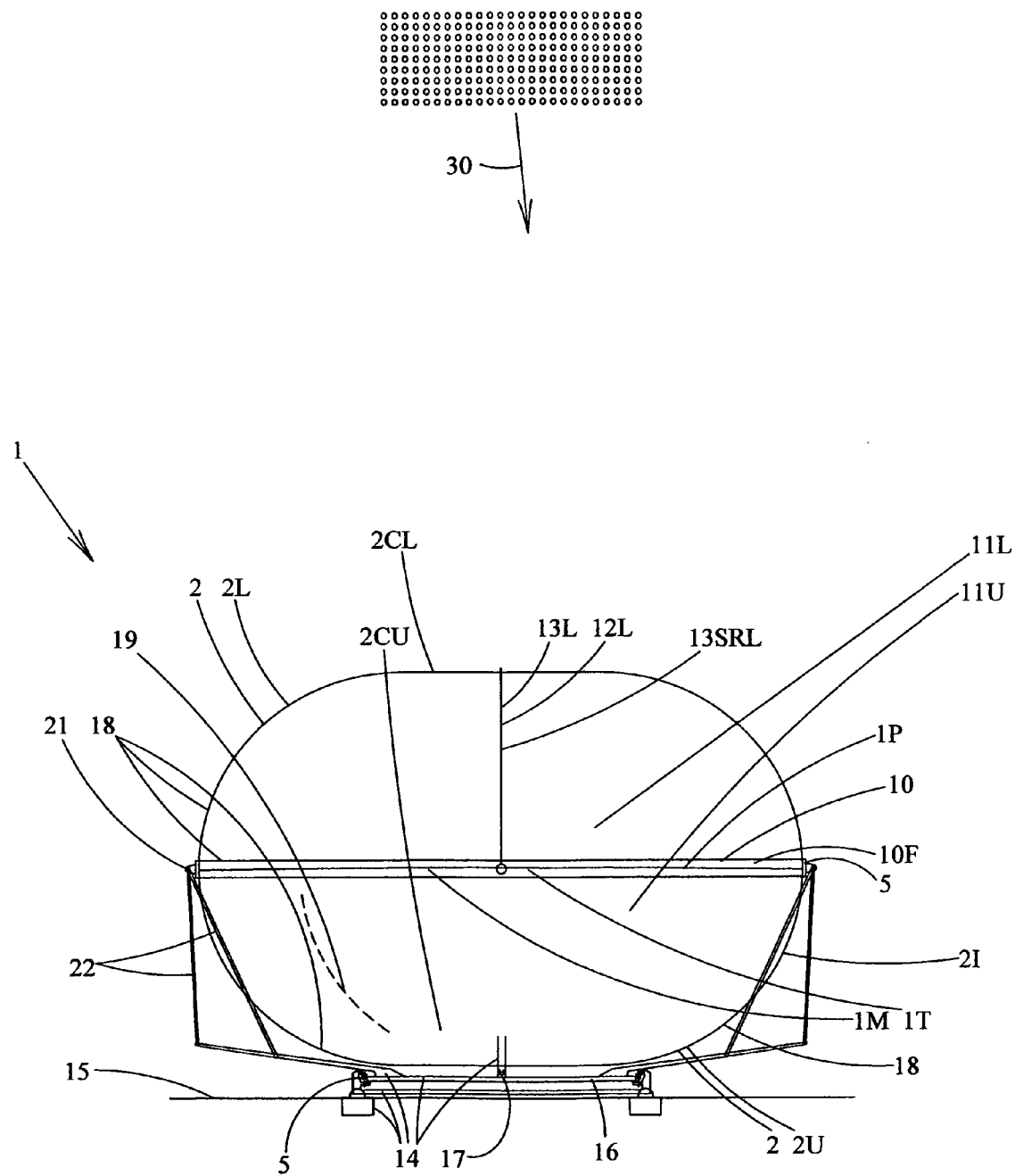
FIG. 4B shows the same embodiment as FIG. 4A, but in a stowed survival configuration.

FIG. 4B shows the same embodiment as FIG. 4A, but in a stowed survival configuration for adverse weather conditions that present a severe threat from above, such as a hailstorm. In this view it is evident how said lower inflation stabilizable near-spherical surface element means 2L serve as means for enhancing adverse weather survival for said mirror 1M in a stowed survival configuration, under adverse weather conditions comprising at least one of severe winds below a $2^{nd}$ threshold level, serious frozen precipitation 30 below a $3^{rd}$ threshold level and significant sandstorm particles below a $4^{th}$ threshold level, when said lower inflated volume 11L is fully inflated.

The expression "serious frozen precipitation below a $3^{rd}$ threshold level" refers to serious frozen precipitation 30 such as severe hail, hail, sleet, frozen rain, and/or snow, with the $3^{rd}$ threshold level referring to at least one of: (i) an absolute level of pounds of frozen precipitation per unit time per unit area, (ii) a probabilistic relative level of pounds of frozen precipitation per unit time per unit area, (iii) an absolute level of hailstone weight and volume for hailstorm survival, (iv) a probabilistic relative level of hailstone weight and volume for hailstorm survival, and (v) another absolute measure, and (vi) another probabilistic relative measure.

While FIG. 4B shows one particular embodiment of the invention in an approximately inverted stowed survival configuration for hailstorm survival, it should be understood that other embodiments can similarly be commanded to an approximately inverted stowed survival configuration for hailstorm survival. Partially inverted configurations with the lower inflation stabilizable near-spherical surface element means 2L and (if applicable) the lower inflation stabilizable near-cylindrical surface element means 2CL facing an angled threat by a wind-driven hailstones, other precipitation, sandstorm or other angled threat, are also possible for this and other embodiments within the spirit and scope of the invention.

Figure 5A:
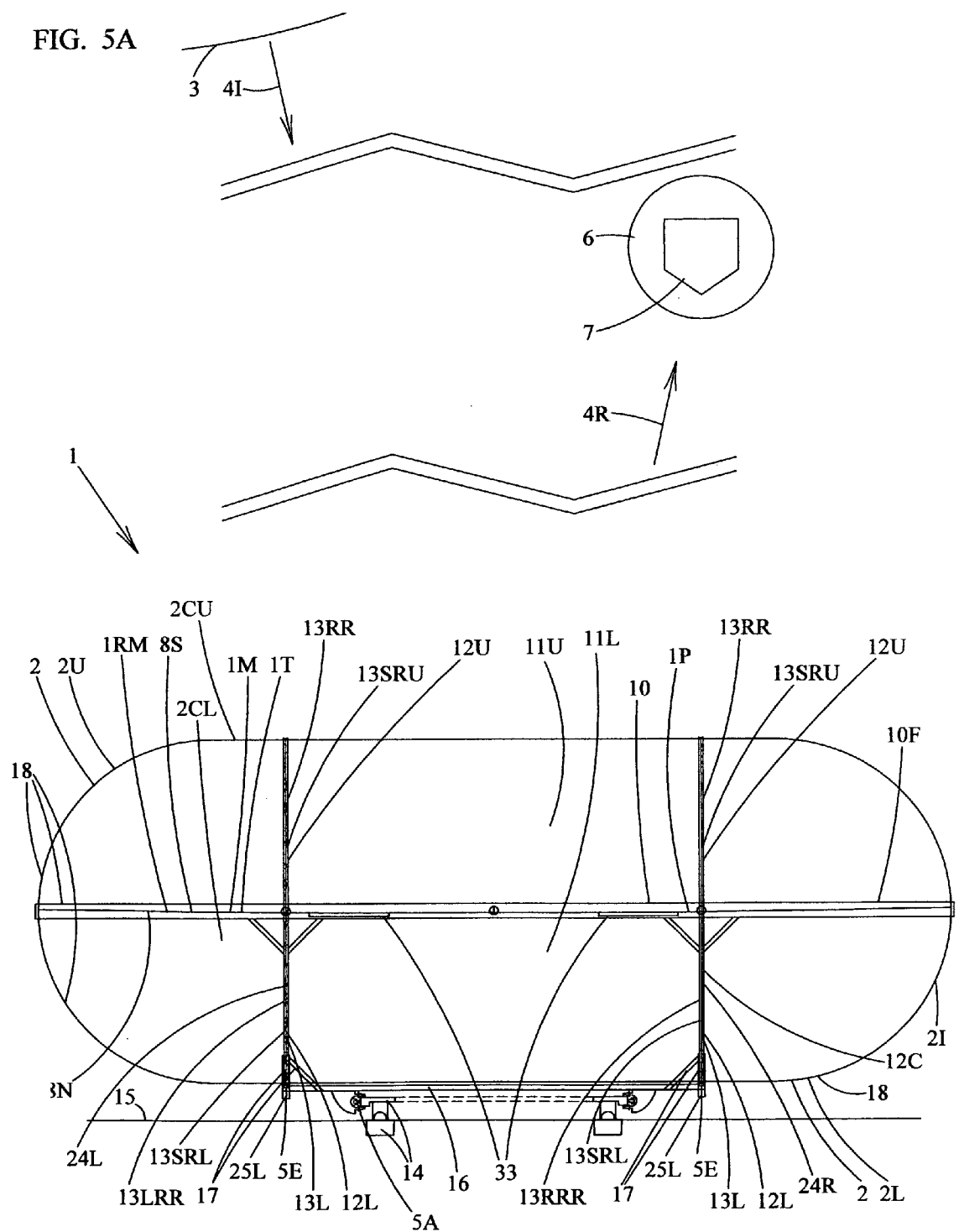
FIG. 5A shows a side view of another preferred embodiment of the invention.

FIG. 5A shows a side view of another preferred embodiment of the invention. This embodiment utilizes two laterally spaced support and elevation control rings or loops, and does not need the pivot support members 22 and pivot bearings 21 of the FIG. 1 embodiment. The laterally spaced support and elevation control loops may utilize components of prior known types, such as ring bearings between inner rotatable in elevation rings and outer fixed rings supported by support structure from a rotatable (in azimuth) base member 16.

The embodiment of FIG. 5A can of course be built in various very varying scales, but in one preferred version could have a cylindrical portion diameter of about 8'3" and overall span of about 2'6", to permit it to be easily transportable in a folded configuration in standard hi-cube 45' long containers, with approximately 6 folded units per container for cost-effective transport by truck or train. The folding could entail rotation of the support and elevation control loops around perimeter frame hinged attach points, with corner braces disconnected or folded away and deflation of the inflatable volumes.

The backing member means 33 may entail visco-elastic materials for damping, and/or framing members or battens for shape-holding.

FIG. 5A shows many of the same features shown earlier in FIG. 1, for which the detailed description text will not be repeated here.

FIG. 5A further shows:
the low-cost heliostatic mirror 1, further comprising: two lower perimeter members 13L of near-circular arc form that are structurally contiguous to (i) lower perimeters of said lower inflatable volume 11L when said lower inflatable volume 11L is fully inflated and to (ii) said perimeter support means 10 at its upper ends; and mirror support means 14 for supporting said mirror 1M on a ground surface 15 which mirror support means 14 includes a rotatable base member 16 (here a rotatable truss-type structure) and connecting support means 17 for supporting said two lower perimeter members 13L above said rotatable base member 16.

FIG. 5A further shows:
the low-cost heliostatic mirror 1, wherein said two lower perimeter members 13L comprise two substantially rigid lower perimeter members 13SRL of approximately circular arc form, which two substantially rigid lower perimeter members 13SRL of approximately circular arc form are each structurally connected at their upper ends to the lower ends of two corresponding substantially rigid upper perimeter members 13 SRU of approximately circular arc form, such that together they form two substantially rigid rings 13RR that surround an inflatable contiguous volume that includes both said lower inflatable volume 11L and said upper inflatable volume 11U; and wherein said connecting support means 17 connects to and supports and restrains said two substantially rigid rings 13RR.

The two substantially rigid rings 1 3RR may include, as in this embodiment, concentric ring-bearing connected members as in this embodiment, to permit elevation control of the low-cost heliostatic mirror 1 by elevation control means 5E, while still restraining the device from unwanted vertical or lateral movement such as winds may try to induce.

FIG. 5A further shows:
the low-cost heliostatic mirror 1, wherein said two substantially rigid rings 13RR are designated as a left substantially rigid ring 13LRR and a right substantially rigid ring 13RRR, and further comprising:
left loop means 24L comprising at least one of a belt, a toothed belt, a belt with holes, a chain, and a concentric ring-bearing-connected member, that loops around both (a) the upper part of said left substantially rigid ring 13LRR and (b) at least one left roller element 25L connected to said rotatable base member 16; which left loop means 24L serves as vertical restraint means for restraining said left substantially rigid ring 13LRR from upward vertical movement; and right loop means 24R comprising at least one of a belt, a toothed belt, a belt with holes, a chain, and a concentric ring-bearing-connected member, that loops around both (a) the upper part of said right substantially rigid ring 13RRR and (b) at least one right roller element 25R connected to said rotatable base member 16; which right loop means 24R serves as vertical restraint means for restraining said right substantially rigid ring 13RRR from upward vertical movement.

FIG. 5A further shows:
the low-cost heliostatic mirror 1, further comprising backing member means 33 adjacent to the nonsunward side of said reflective membrane 1RM, for facilitating at least one of (i) maintaining a desired shape of the reflective membrane 1RM and (ii) damping motion of the reflective membrane 1RM.

Figure 5B:
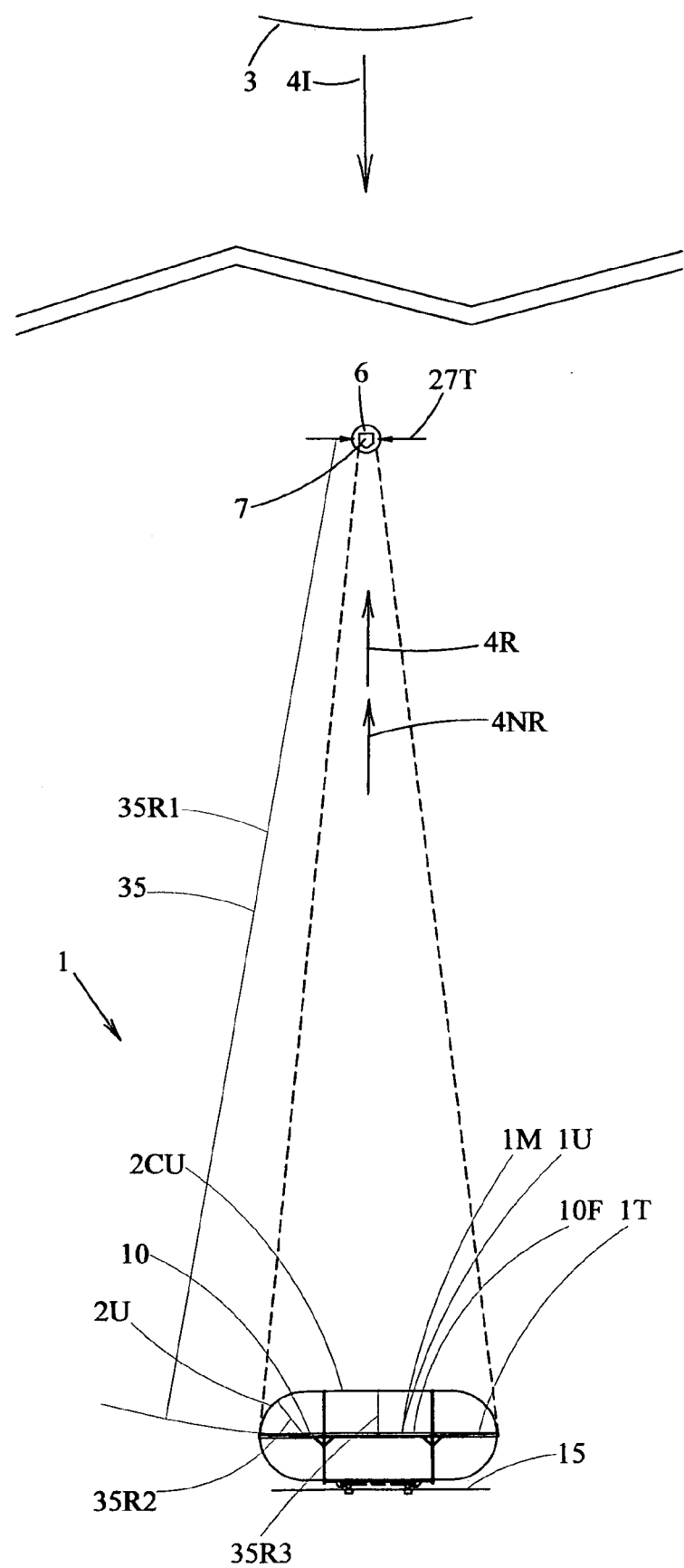
FIG. 5B shows the same embodiment as FIG. 5A, from a much more distant viewpoint.

FIG. 5B shows the same embodiment as FIG. 5A, from a much more distant viewpoint so that a target region 6 at which a solar receiver 7 can be located can be seen in the view without a view break jagged line.

FIG. 5B shows:
the low-cost heliostatic mirror 1, wherein said perimeter support frame 10F further provides perimeter edge support for said thin reflective surface means 1T, which thin reflective surface means 1T has a surface geometry that is close to the surface of a true sphere 35 with a center at least one of: in and near said target region 6.

FIG. 5B further shows:
the low-cost heliostatic mirror 1, wherein said mirror 1M comprising thin reflective surface means 1T for reflecting incident sunlight 4I, comprises upwardly concave thin reflective surface means 1U for reflecting and concentrating said incident sunlight 4I to form a reflected sunlight beam 4R that is a narrowing reflected sunlight beam 4NR, which upwardly concave thin reflective surface means 1U has a near-spherical shape approximating the surface of a true sphere 35R1 with radius R1; wherein said substantially transparent upper inflation stabilizable near-spherical surface element means 2U have near-spherical shapes approximating the surfaces of true spheres 35R2 with radius R2; wherein said substantially transparent upper inflation stabilizable near-cylindrical surface element means 2CU have near-cylindrical shapes approximating the surface of a true cylinder 35R3 with radius R3; wherein said perimeter support means 10 comprises a perimeter support frame 10F; wherein said perimeter support frame 10F substantially supports edges of said substantially transparent upper inflation stabilizable near-spherical surface element means 2U approximately along first geometric lines of intersection of said surface of a true sphere 35R1 with radius R1 on one hand, and said surfaces of true spheres 35R2 with radius R2 on the other hand; and wherein said perimeter support frame 10F substantially supports edges of said substantially transparent upper inflation stabilizable near-cylindrical surface element means 2CU along second geometric lines of intersection of said surface of a true sphere 35R1 with radius R1 on one hand, and said surface of a true cylinder 35R3 with radius R3 on the other hand.

Figure 5C:
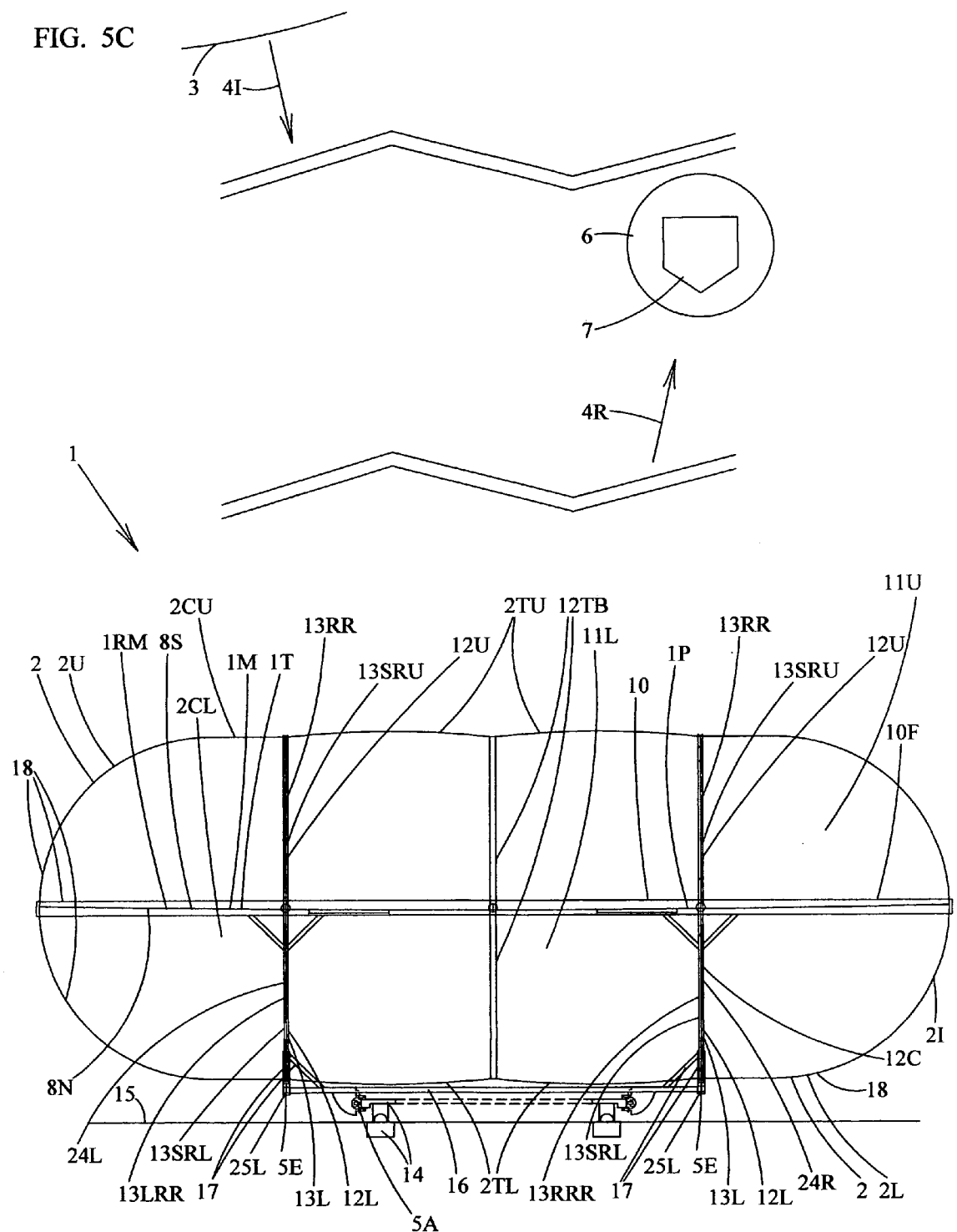
FIG. 5C shows an embodiment similar to that of FIG. 5A, but with some "pillowing" of the inflated cylinder.

FIG. 5C shows an embodiment similar to that of FIG. 5A, but with some "pillowing" of the inflated cylinder to form inflated approximately toroidal surfaces, and with an additional tension band. More specifically, a tension band 12TB is used to minimize cylindrical section pillowing under inflation loads. The upper portion or the entire tension band 12TB may be transparent, to avoid shadowing losses from the band shading sunlight going to or from the mirror 1M. Note that in alternate embodiments (such as one similar to the FIG. 4A embodiment, without being limiting) an upper transparent half-circle tension band may connect in tension with a lower half circle lower perimeter member 13L such as a substantially rigid lower perimeter member 13SRL. In still other alternate embodiments different numbers of full or partial tension bands 12TB may be provided as beneficial.

In the FIG. 5C embodiment lower inflation stabilizable near-toroidal surface element means 2TL and substantially transparent upper inflation stabilizable near-toroidal surface element means 2TU are provided.

FIG. 5C therefore shows:
  a low-cost heliostatic mirror 1 with inflation stabilizable surface element means 2 for providing adverse weather performance & survival, comprising:
  a mirror 1M comprising thin reflective surface means 1T for reflecting incident sunlight 4I when the Sun 3 is shining and visible;
  heliostatic control means 5 for angular pointing of said mirror 1M so as to cause said mirror 1M to reflect said incident sunlight 4I to form a reflected sunlight beam 4R going to a target region 6 at which a solar receiver 7 can be located;
  perimeter support means 10 for accurately setting and holding the perimeter of said thin reflective surface means 1T in a desired orientation as commanded by said heliostatic control means 5; and
  inflation stabilizable surface element means 2 for enhancing adverse weather performance & survival for said mirror 1M, which inflation stabilizable surface element means 2 include
  (i) substantially transparent upper inflation stabilizable near-spherical surface element means 2U on lateral sides of substantially transparent upper inflation stabilizable near-toroidal surface element means 2TU all located above an upper inflatable volume 11U above the sunlight reflecting sunward side of said mirror 8S, and
  (ii) lower inflation stabilizable near-spherical surface element means 2L on lateral sides of lower inflation stabilizable near-toroidal surface element means 2TL all located below a lower inflatable volume 11L below the nonsunward side of said mirror 8N;
  and wherein:
  said (i) substantially transparent upper inflation stabilizable near-spherical surface element means 2U on lateral sides of substantially transparent upper inflation stabilizable near-toroidal surface element means 2TU and (ii) lower inflation stabilizable near-spherical surface element means 2L on lateral sides of lower inflation stabilizable near-toroidal surface element means 2TL, all together serve as means for enhancing adverse weather performance for said mirror 1M under adverse weather conditions comprising winds below a $1^{st}$ threshold level, when said upper inflatable volume 11U and lower inflatable volume 11L are fully inflated;
  and wherein:
  said (ii) lower inflation stabilizable near-spherical surface element means 2L on lateral sides of lower inflation stabilizable near-toroidal surface element means 2TL, together serve as means for enhancing adverse weather survival for said mirror 1M in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

Figure 6A:
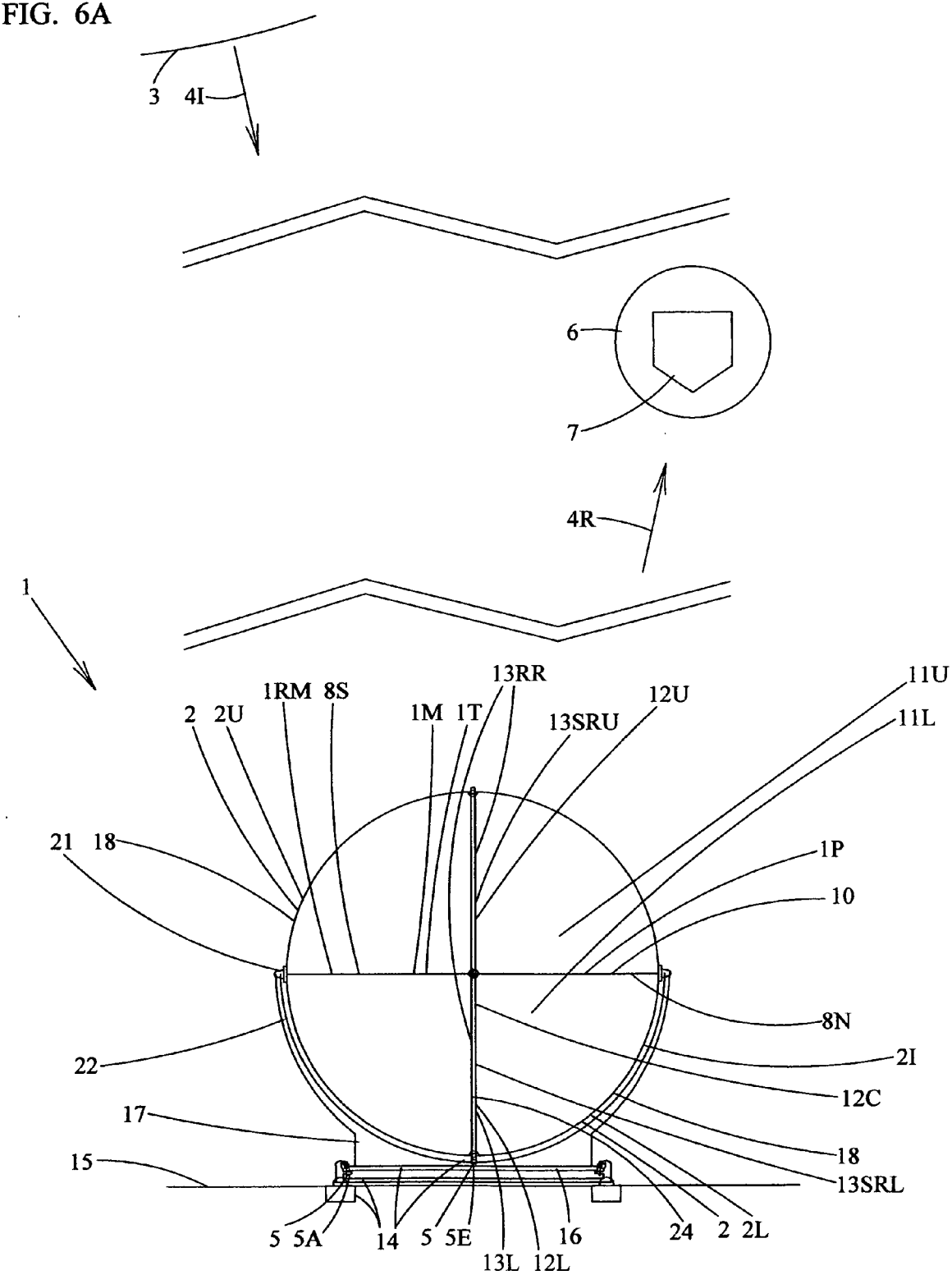
FIG. 6A shows a side view of another preferred embodiment of the invention.

FIG. 6A shows a side view of another preferred embodiment of the invention. A notable feature of this embodiment is the use of a tubular substantially rigid ring 13RR that is fitted with gear teeth on the outside, which are engaged by a worm gear type of elevation control means 5E. In addition to the elevation control means 5E, the heliostatic control means 5 also includes azimuth control means SA acting on the rotatable base member 16.

The elevation control means 5E, here a worm gear, acts on said substantially rigid lower perimeter member by rotationally orienting said substantially rigid lower perimeter member 13SRL to a commanded elevation angle. It is understood that alternate gear, belt, chain and/or other control mechanisms known from the prior art could be used in lieu of a worm gear mechanism, and that similarly AC, DC and continuous or stepper motors could be utilized.

The substantially transparent upper inflation stabilizable near-spherical surface element means 2U and the lower inflation stabilizable near-spherical surface element means located both have grooves specifically to engage the tubular substantially rigid ring 13RR, as illustrated. Another notable feature is that the perimeter support means 10 here simply comprises a strong seam between the transparent upper inflatable surface on the sunward side of the upper inflated volume 11U and a typically nontransparent, lower cost but more weather resistant, lower inflatable surface on the nonsunward side of the mirror 1M below the lower inflated volume 11L. Still another feature of this embodiment is the use of curved, preferably tubular pivot support members 22, as illustrated. Various cross-sections, shapes and tapers can be used to balance cost, weight, wind-sensitivity and load-resistance capabilities of the pivot support members 22. A variant embodiment can also appear the same as FIG. 6A in this side view, but use two angled pivot support members on each side, meeting at the top but spaced apart fore and aft at the bottom where they structurally connect with the rotatable base member 16.

More specifically, FIG. 6A shows:
  a low-cost heliostatic mirror 1 with inflation stabilizable surface element means 2 for providing adverse weather performance & survival, comprising:
  a mirror 1M comprising thin reflective surface means 1T for reflecting incident sunlight 4I when the Sun 3 is shining and visible;
  heliostatic control means 5 for angular pointing of said mirror 1M so as to cause said mirror 1M to reflect said incident sunlight 4I to form a reflected sunlight beam 4R going to a target region 6 at which a solar receiver 7 can be located;
  perimeter support means 10 for accurately setting and holding the perimeter of said thin reflective surface means 1T in a desired orientation as commanded by said heliostatic control means 5;

inflation stabilizable surface element means 2 for enhancing adverse weather performance & survival for said mirror 1M, which inflation stabilizable surface element means 2 include substantially transparent upper inflation stabilizable near-spherical surface element means 2U located above an upper inflatable volume 11U above the sunlight reflecting sunward side of said mirror 8S, and lower inflation stabilizable near-spherical surface element means 2L located below a lower inflatable volume 11L below the nonsunward side of said mirror 8N; and connecting lower perimeter encircling means 12L and upper perimeter encircling means 12U for encircling the lower perimeter of said lower inflatable volume 11L and the upper perimeter of said upper inflatable volume 11U respectively, which connecting lower perimeter encircling means 12L and upper perimeter encircling means 12U form a near-circular closed loop 12C in circumferential tension when said lower inflated volume 11L and upper inflatable volume 11U are both fully inflated;

and wherein:
(a) said substantially transparent upper inflation stabilizable near-spherical surface element means 2U and lower inflation stabilizable near-spherical surface element means 2L together serve as means for enhancing adverse weather performance for said mirror 1M under adverse weather conditions comprising winds below a $1^{st}$ threshold level, when said upper inflatable volume 11U and lower inflatable volume 11L are fully inflated;

and wherein:
(b) said lower inflation stabilizable near-spherical surface element means 2L serve as means for enhancing adverse weather survival for said mirror 1M in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

FIG. 6A also shows:
a low-cost heliostatic mirror 1 with inflation stabilizable surface element means 2 for providing adverse weather performance & survival, comprising:
a mirror 1M comprising thin reflective surface means 1T for reflecting incident sunlight 4I when the Sun 3 is shining and visible;
heliostatic control means 5 for angular pointing of said mirror 1M so as to cause said mirror 1M to reflect said incident sunlight 4I to form a reflected sunlight beam 4R going to a target region 6 at which a solar receiver 7 can be located;
perimeter support means 10 for accurately setting and holding the perimeter of said thin reflective surface 1T means in a desired orientation as commanded by said heliostatic control means 5;
inflation stabilizable surface element means 2 for enhancing adverse weather performance & survival for said mirror 1M, which inflation stabilizable surface element means 2 include substantially transparent upper inflation stabilizable near-spherical surface element means 2U located above an upper inflatable volume 11U above the sunlight reflecting sunward side of said mirror 8S, and lower inflation stabilizable near-spherical surface element means 2L located below a lower inflatable volume 11L below the nonsunward side of said mirror 8N;
a lower perimeter member 13L of near-circular arc form that is structurally contiguous to (i) a lower perimeter of said lower inflatable volume 11L when said lower inflatable volume 11L is fully inflated and to (ii) said perimeter support means 10 at its upper ends;
and mirror support means 14 for supporting said mirror 1M on a ground surface 15 which mirror support means 14 includes a rotatable base member 16 and connecting support means 17 for connecting said lower perimeter member 13L to said rotatable base member 16;

and wherein:
(a) said substantially transparent upper inflation stabilizable near-spherical surface element means 2U and lower inflation stabilizable near-spherical surface element means 2L together serve as means for enhancing adverse weather performance for said mirror 1M under adverse weather conditions comprising winds below a $1^{st}$ threshold level, when said upper inflatable volume 11U and lower inflatable volume 11L are fully inflated;

and wherein:
(b) said lower inflation stabilizable near-spherical surface element means 2L serve as means for enhancing adverse weather survival for said mirror 1M in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume 11L is fully inflated.

Figure 6B:
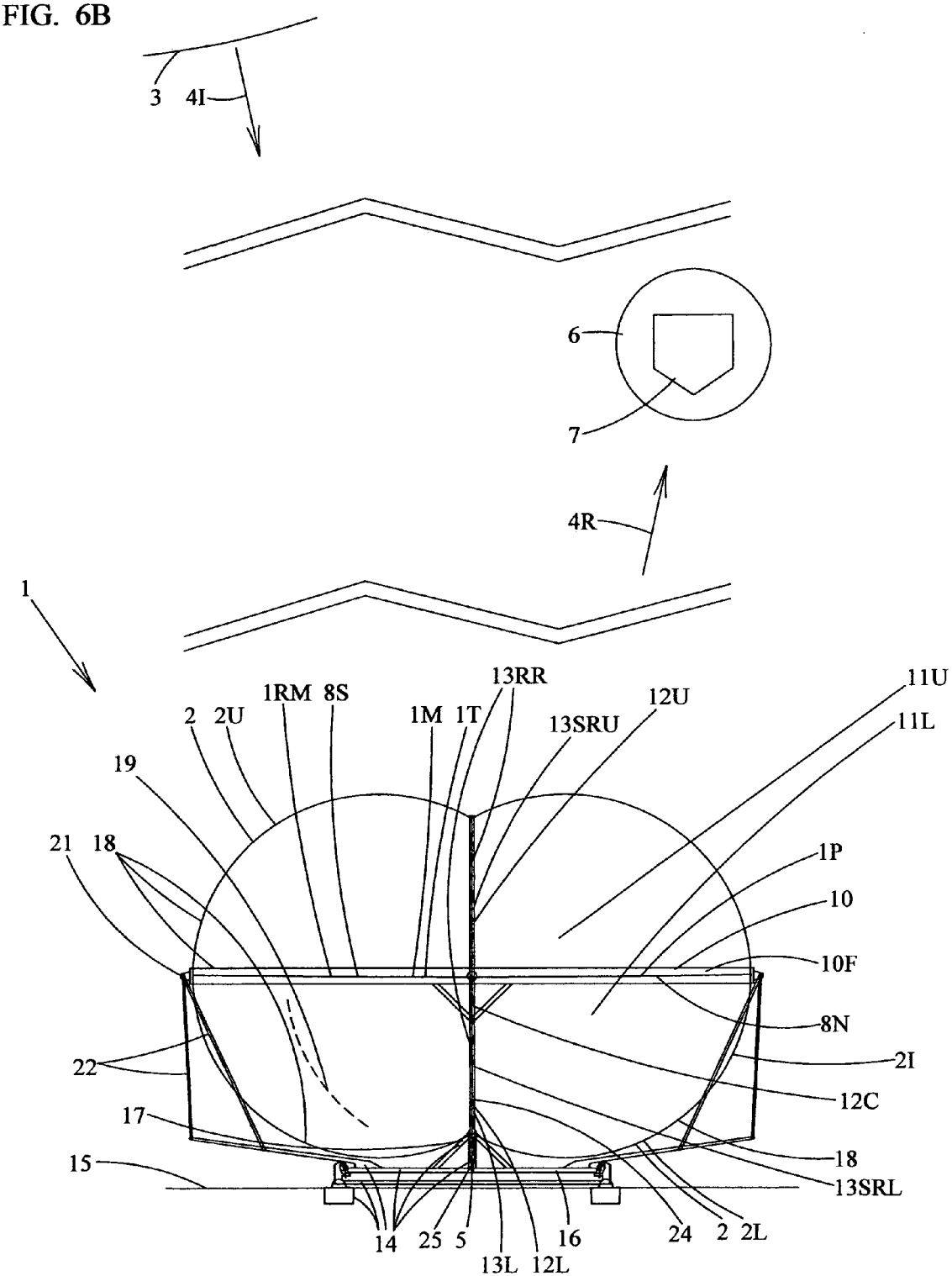
FIG. 6B shows a side view of another preferred embodiment of the invention.

FIG. 6B shows a side view of another preferred embodiment of the invention, with some features in common with the embodiment of FIG. 1 and some other features in common with the embodiment of FIG. 6A. The substantially rigid ring 13RR here engages a reduced diameter or crevice ring zone between left and right lobes of the inflatable structure, which should increase the ability of the device to resist wind loads for severe winds going left to right or vice-versa in this side view, with the substantially rigid ring 13RR and the pivot bearings 21 both contributing to resisting these thrust loads.

Figure 7:
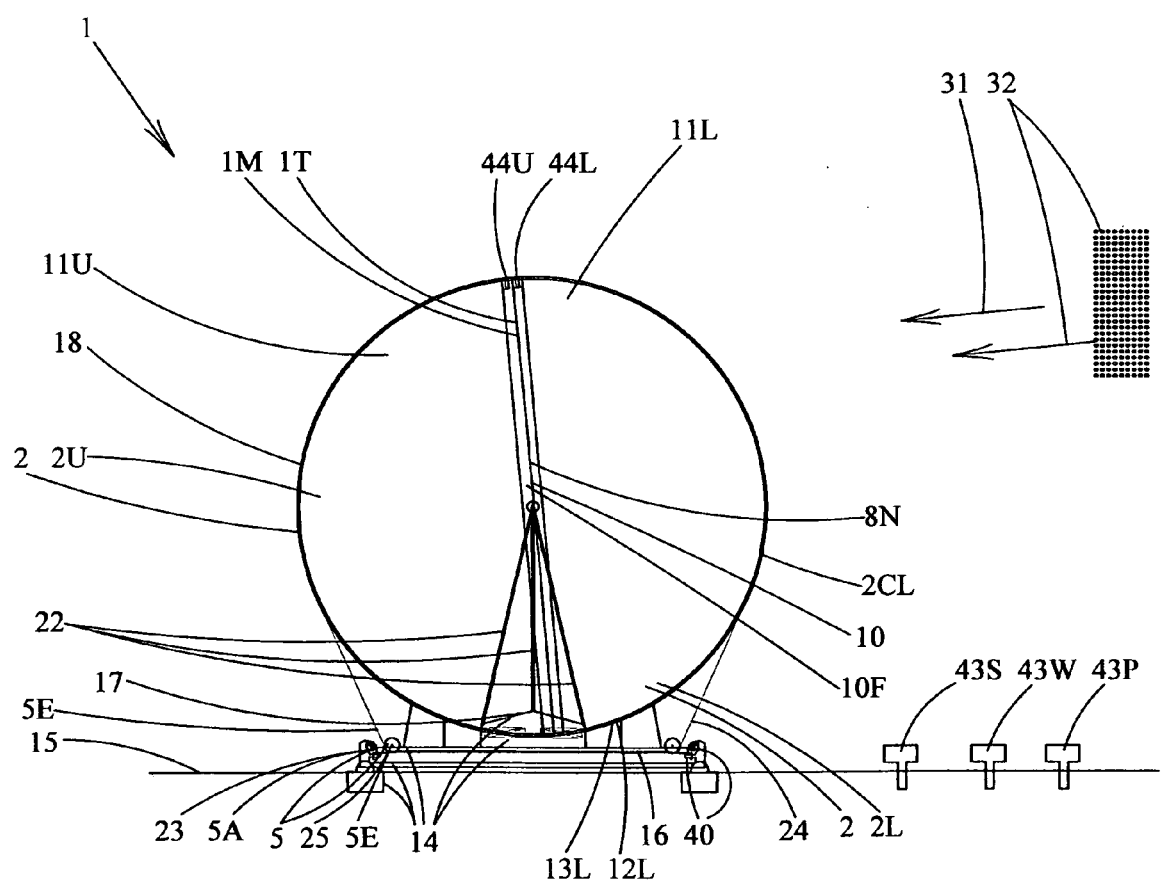
FIG. 7 shows an end view of the embodiment of FIG. 6B.

FIG. 7 shows an end view of the embodiment of FIG. 6B, with the device in an adverse weather survival configuration under representative conditions of at least one of severe winds 31 below a $2^{nd}$ threshold level, severe wind blown serious frozen precipitation below a $3^{rd}$ threshold level and significant sandstorm particles 32 below a $4^{th}$ threshold level, when said lower inflated volume 11L is fully inflated. A combination of severe winds 31 and significant sandstorm particles 32 are shown in the illustrated embodiment. The heliostatic control system will preferably command the device to an optimum survival azimuth and elevation angle depending on the strength and direction of the threat as measured by one or more or wind sensor means 43W; particle sensor means 43P for sensing frozen particles and/or sand particles and/or other particles; and Sun sensor means 43S as well (for example, a stow command may occur at a lower threat level if the Sun is not visible and the powerplant is not generating solar power anyway, as under cloud-covered sky conditions).

FIG. 7 also illustrates upper inflation control means 44U for controlling the pressure in the upper inflated volume 11U and lower inflation control means 44L for controlling the pressure in the lower inflated volume 11L. Inflation components like pumps, inflation valves, deflation valves, etc can be used for these purposes. These can be used for various beneficial purposes during normal as well as non-normal or emergency situations, including maintaining appropriate pressures for optimal inflatable structures performance and weather protection, optimized temperature effects compensation, maintaining appropriate differential pressure between the upper and lower inflated volumes to maintain a reflective membrane mirror in a desired concave-up focusing shape, and emergency defocus to make the mirror non-concave up if necessary for some emergency condition, for example a solar receiver excess temperature or working fluid rupture situation. The upper inflation control means 44U and lower inflation control means 44L may use powered inflator devices or not, may be individual per heliostat or centrally plumbed, and may feature other aspects of inflation control and management technologies and devices known from the prior art.

Figure 8:
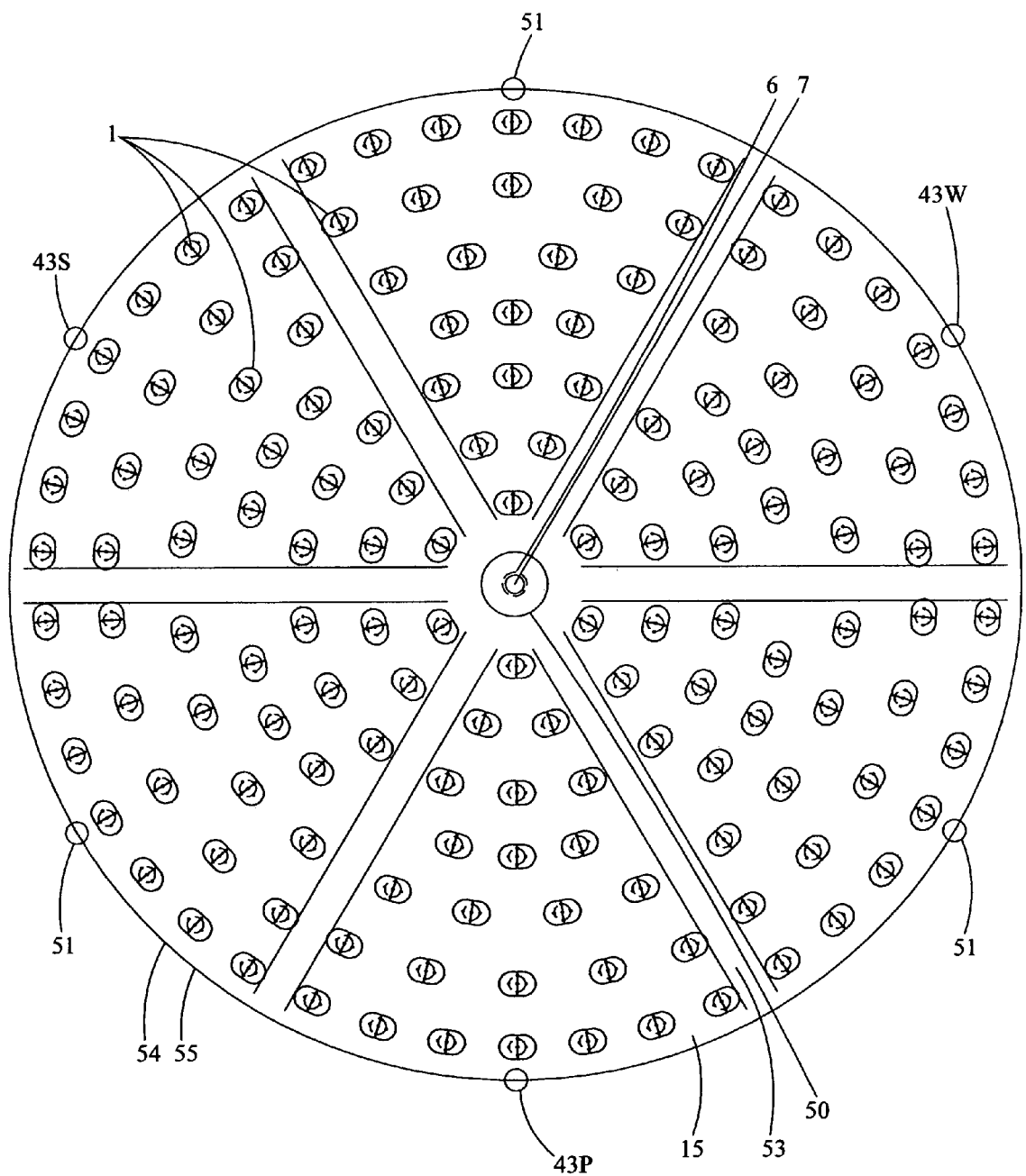
FIG. 8 shows a plan view of a representative field of low-cost heliostatic mirrors.

FIG. 8 shows a plan view of a representative field of low-cost heliostatic mirrors 1 arranged on a ground surface 15 around a central receiver power tower 50. In different central receiver power tower systems different numbers and arrangements of heliostats can be used as known from the prior art. FIG. 8 also illustrates representative particle sensor means 43P, representative Sun sensor means 43S and representative wind sensor means 43W. Further, FIG. 8 also shows aiming calibration means 51 for calibrating the appropriate aiming or pointing of each of the heliostats (i.e., the low-cost heliostatic mirrors 1) so that they correctly track the Sun's apparent motion and reflect concentrate light to fall upon a solar receiver 7 at a target region 6 sited on top of the central receiver power tower 50. The illustrated aiming calibration means 51 comprises pointable lasers on top of posts at three (or optionally more) different locations relative to the heliostat field, to permit triangulation techniques for calibration as known from the prior art. FIG. 8 also illustrates maintenance access means 53 such as the illustrated roads, and both radial and azimuthal roads may be provided for maintenance, cleaning, repair and/or replacement of heliostats. Part of the cleaning process after a dust storm might be for a water truck to hose down the transparent upper membranes of the heliostats, which may also have self-cleaning attribute materials such as ETFE construction. FIG. 8 also illustrates perimeter fence means 54 for both security and other-purposes; with one of the other purposes being to reduce surface wind magnitudes acting on the heliostats, and to reduce wind-blown particles near the ground surface. Wind protection means 55 for reducing surface wind magnitudes acting on the heliostats serve this purpose, and may utilize some wind-restraint and/or wind-deflecting fence technology as known from the prior art.

While certain preferred embodiments of the invention have been described with reference to the attached Figures, it should be understood that further variations and alternate embodiments of the invention are possible within the spirit and scope of the invention as defined in the attached Claims.

REFERENCES

1. Mithra M. K. V. Sankrithi, U.S. Pat. No. 5,404,868, "Apparatus Using a Balloon Supported Reflective Surface for Reflecting Light from the Sun," issued Apr. 11, 1995
2. Mithra M. K. V. Sankrithi, U.S. Department of Energy Final Technical Report DE-FG36-01GO11023, A000, "Low-Cost Inflatable-Support Heliostats to Enable Cost-Effective Large-Scale Solar Thermal Power," Nov. 24, 2002
3. Sighard F. Hoerner & Henry V. Borst, *Fluid Dynamic Lift*, $2^{nd}$ Edition, Hoerner Fluid Dynanics, P.O. Box 21992, Bakersfield, Calif. 93390, 1985

What is claimed is:

1. A low-cost heliostatic mirror with inflation stabilizable surface element means for providing adverse weather performance & survival, comprising:

a mirror comprising thin reflective surface means for reflecting incident sunlight when the Sun is shining and visible;

heliostatic control means for angular pointing of said mirror so as to cause said mirror to reflect said incident sunlight to form a reflected sunlight beam going to a target region at which a solar receiver can be located;

perimeter support means for accurately setting and holding the perimeter of said thin reflective surface means in a desired orientation as commanded by said heliostatic control means;

inflation stabilizable surface element means for enhancing adverse weather performance & survival for said mirror, which inflation stabilizable surface element means include substantially transparent upper inflation stabilizable near-spherical surface element means located above an upper inflatable volume above the sunlight reflecting sunward side of said mirror, and lower inflation stabilizable near-spherical surface element means located below a lower inflatable volume below the non-sunward side of said mirror;

and connecting lower perimeter encircling means and upper perimeter encircling means for encircling the lower perimeter of said lower inflatable volume and the upper perimeter of said upper inflatable volume respectively, which connecting lower perimeter encircling means and upper perimeter encircling means form a near-circular closed loop in circumferential tension when said lower inflated volume and upper inflatable volume are both fully inflated;

and wherein:

(a) said substantially transparent upper inflation stabilizable near-spherical surface element means and lower inflation stabilizable near-spherical surface element means together serve as means for enhancing adverse weather performance for said mirror under adverse weather conditions comprising winds below a $1^{st}$ threshold level, when said upper inflatable volume and lower inflatable volume are fully inflated;

and wherein:

(b) said lower inflation stabilizable near-spherical surface element means serve as means for enhancing adverse weather survival for said mirror in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume is fully inflated.

2. The low-cost heliostatic mirror of claim 1, wherein said mirror comprising thin reflective surface means for reflecting incident sunlight, comprises upwardly concave thin reflective surface means for reflecting and concentrating said incident sunlight to form a to form a reflected sunlight beam that is narrowing reflected sunlight beam, and wherein the target projected area of said target region that can receive said reflected sunlight beam, is less than the projected reflective area of said upwardly concave thin reflective surface means.

3. The low-cost heliostatic mirror of claim 1, wherein:

a mirror comprising thin reflective surface means for reflecting incident sunlight comprises a reflective membrane with an upper reflective surface, and wherein said perimeter support means comprises at least one of a perimeter support frame and a substantially rigid perimeter support ring.

4. The low-cost heliostatic mirror of claim 3, further comprising backing member means adjacent to the nonsunward side of said reflective membrane, for facilitating at least one of (i) maintaining a desired shape of the reflective membrane and (ii) damping motion of the reflective membrane.

5. The low-cost heliostatic mirror of claim 1, wherein: said inflation stabilizable surface element means are connected to said perimeter support means, and wherein said inflation stabilizable surface element means and said perimeter support means together form a near-spherical envelope surrounding said mirror when said upper inflatable volume and lower inflatable volume are fully inflated, and wherein at least one of:
(i) said near-spherical envelope has a surface geometry that lies entirely within a volume defined by a true sphere's surface and regions within a 25% diameter distance of said true sphere's surface; and
(ii) said near-spherical envelope has a surface geometry that serves as aerodynamic moment minimizing means for yielding relatively small aerodynamic moments responsive to wind applied from arbitrary angles on said surface geometry, wherein an aerodynamic moment is relatively small if the nondimensionalized aerodynamic moment coefficient per radian of angle of attack has a magnitude less than three halves.

6. The low-cost heliostatic mirror of claim 1, wherein: said inflation stabilizable surface element means comprise substantially gas-impermeable membrane members.

7. A low-cost heliostatic mirror with inflation stabilizable surface element means for providing adverse weather performance & survival, comprising:
a mirror comprising thin reflective surface means for reflecting incident sunlight when the Sun is shining and visible;
heliostatic control means for angular pointing of said mirror so as to cause said mirror to reflect said incident sunlight to form a reflected sunlight beam going to a target region at which a solar receiver can be located;
perimeter support means for accurately setting and holding the perimeter of said thin reflective surface means in a desired orientation as commanded by said heliostatic control means; and
inflation stabilizable surface element means for enhancing adverse weather performance & survival for said mirror, which inflation stabilizable surface element means include
(i) substantially transparent upper inflation stabilizable near-spherical surface element means on lateral sides of substantially transparent upper inflation stabilizable near-cylindrical surface element means all located above an upper inflatable volume above the sunlight reflecting sunward side of said mirror, and
(ii) lower inflation stabilizable near-spherical surface element means on lateral sides of lower inflation stabilizable near-cylindrical surface element means all located below a lower inflatable volume below the nonsunward side of said mirror;
and wherein:
said (i) substantially transparent upper inflation stabilizable near-spherical surface element means on lateral sides of substantially transparent upper inflation stabilizable near-cylindrical surface element means and (ii) lower inflation stabilizable near-spherical surface element means on lateral sides of lower inflation stabilizable near-cylindrical surface element means, all together serve as means for enhancing adverse weather performance for said mirror under adverse weather conditions comprising winds below a $1^{st}$ threshold level, when said upper inflatable volume and lower inflatable volume are fully inflated;
and wherein:
said (ii) lower inflation stabilizable near-spherical surface element means on lateral sides of lower inflation stabilizable near-cylindrical surface element means, together serve as means for enhancing adverse weather survival for said mirror in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume is fully inflated.

8. The low-cost heliostatic mirror of claim 7, wherein the lateral width of said substantially transparent upper inflation stabilizable near-cylindrical surface element means is less than two times the effective diameter of said substantially transparent upper inflation stabilizable near-spherical surface element means; and wherein the lateral width of said lower inflation stabilizable near-cylindrical surface element means is less than two times the effective diameter of said lower inflation stabilizable near-spherical surface element means.

9. The low-cost heliostatic mirror of claim 7, further comprising:
a lower perimeter member of near-circular arc form that is structurally contiguous to (i) a lower perimeter of said lower inflatable volume when said lower inflatable volume is fully inflated and to (ii) said perimeter support means at its upper ends;
and mirror support means for supporting said mirror on a ground surface which mirror support means includes a rotatable base member and connecting support means for supporting said lower perimeter member above said rotatable base member.

10. The low-cost heliostatic mirror of claim 7, further comprising:
two lower perimeter members of near-circular arc form that are structurally contiguous to (i) lower perimeters of said lower inflatable volume when said lower inflatable volume is fully inflated and to (ii) said perimeter support means at its upper ends;
and mirror support means for supporting said mirror on a ground surface which mirror support means includes a rotatable base member and connecting support means for supporting said two lower perimeter members above said rotatable base member.

11. The low-cost heliostatic mirror of claim 10, wherein said two lower perimeter members comprise two substantially rigid lower perimeter members of approximately circular arc form, which two substantially rigid lower perimeter members of approximately circular arc form are each structurally connected at their upper ends to the lower ends of two corresponding substantially rigid upper perimeter members of approximately circular arc form, such that together they form two substantially rigid rings that surround an inflatable contiguous volume that includes both said lower inflatable volume and said upper inflatable volume; and wherein said connecting support means connects to and supports and restrains said two substantially rigid rings.

12. The low-cost heliostatic mirror of claim 11, wherein said two substantially rigid rings are designated as a left substantially rigid ring and a right substantially rigid ring, and further comprising:
left loop means comprising at least one of a belt, a toothed belt, a belt with holes, a chain, and a concentric ring-bearing-connected member, that loops around both (a) the upper part of said left substantially rigid ring and (b) at least one left roller element connected to said rotatable base member; which left loop means serves as vertical restraint means for restraining said left substantially rigid ring from upward vertical movement; and
right loop means comprising at least one of a belt, a toothed belt, a belt with holes, a chain, and a concentric ring-bearing-connected member, that loops around both (a) the upper part of said right substantially rigid ring and (b) at least one right roller element connected to said rotatable base member; which right loop means serves as vertical restraint means for restraining said right substantially rigid ring from upward vertical movement.

13. The low-cost heliostatic mirror of claim 7, wherein said perimeter support means comprises a perimeter support frame, and wherein said perimeter support frame supports edges of each of: said substantially transparent upper inflation stabilizable near-spherical surface element means, said substantially transparent upper inflation stabilizable near-cylindrical surface element means, said lower inflation stabilizable near-spherical surface element means, and said lower inflation stabilizable near-cylindrical surface element means.

14. The low-cost heliostatic mirror of claim 13, wherein said perimeter support frame further provides perimeter edge support for said thin reflective surface means, which thin reflective surface means has a surface geometry that is close to the surface of a true sphere with a center at least one of: in and near said target region.

15. The low-cost heliostatic mirror of claim 7, wherein said mirror comprising thin reflective surface means for reflecting incident sunlight, comprises upwardly concave thin reflective surface means for reflecting and concentrating said incident sunlight to form a reflected sunlight beam that is a narrowing reflected sunlight beam, which upwardly concave thin reflective surface means has a near-spherical shape approximating the surface of a true sphere with radius R1; wherein said substantially transparent upper inflation stabilizable near-spherical surface element means have near-spherical shapes approximating the surfaces of true spheres with radius R2; wherein said substantially transparent upper inflation stabilizable near-cylindrical surface element means have near-cylindrical shapes approximating the surface of a true cylinder with radius R3; wherein said perimeter support means comprises a perimeter support frame; wherein said perimeter support frame substantially supports edges of said substantially transparent upper inflation stabilizable near-spherical surface element means approximately along first geometric lines of intersection of said surface of a true sphere with radius R1 on one hand, and said surfaces of true spheres with radius R2 on the other hand; and wherein said perimeter support frame substantially supports edges of said substantially transparent upper inflation stabilizable near-cylindrical surface element means along second geometric lines of intersection of said surface of a true sphere with radius R1 on one hand, and said surface of a true cylinder with radius R3 on the other hand.

16. A low-cost heliostatic mirror with inflation stabilizable surface element means for providing adverse weather performance & survival, comprising:
a mirror comprising thin reflective surface means for reflecting incident sunlight when the Sun is shining and visible;
heliostatic control means for angular pointing of said mirror so as to cause said mirror to reflect said incident sunlight to form a reflected sunlight beam going to a target region at which a solar receiver can be located;
perimeter support means for accurately setting and holding the perimeter of said thin reflective surface means in a desired orientation as commanded by said heliostatic control means;
inflation stabilizable surface element means for enhancing adverse weather performance & survival for said mirror, which inflation stabilizable surface element means include substantially transparent upper inflation stabilizable near-spherical surface element means located above an upper inflatable volume above the sunlight reflecting sunward side of said mirror, and lower inflation stabilizable near-spherical surface element means located below a lower inflatable volume below the non-sunward side of said mirror;
a lower perimeter member of near-circular arc form that is structurally contiguous to (i) a lower perimeter of said lower inflatable volume when said lower inflatable volume is fully inflated and to (ii) said perimeter support means at its upper ends;
and mirror support means for supporting said mirror on a ground surface which mirror support means includes a rotatable base member and connecting support means for connecting said lower perimeter member to said rotatable base member;
and wherein:
(a) said substantially transparent upper inflation stabilizable near-spherical surface element means and lower inflation stabilizable near-spherical surface element means together serve as means for enhancing adverse weather performance for said mirror under adverse weather conditions comprising winds below a $1^{st}$ threshold level, when said upper inflatable volume and lower inflatable volume are fully inflated;
and wherein:
(b) said lower inflation stabilizable near-spherical surface element means serve as means for enhancing adverse weather survival for said mirror in a stowed survival configuration, under adverse weather conditions comprising at least one of severe winds below a $2^{nd}$ threshold level, serious frozen precipitation below a $3^{rd}$ threshold level and significant sandstorm particles below a $4^{th}$ threshold level, when said lower inflated volume is fully inflated.

17. The low-cost heliostatic mirror of claim 16, wherein said heliostatic control means for angular pointing of said mirror includes both elevation control means for controlling the elevation angle of said mirror and azimuth control means for controlling the azimuth angle of said mirror; which elevation control means acts on at least one of said perimeter support means and said lower perimeter member; and which azimuth control means comprises rotational positioning means for rotationally positioning said rotatable base member.

18. The low-cost heliostatic mirror of claim 16, wherein said mirror support means further comprises two substantially coaxial pivot bearings connecting said perimeter support means to pivot support members, wherein the lower ends of said pivot support members are connected to and supported by said rotatable base member.

19. The low-cost heliostatic mirror of claim 16, wherein:
said lower perimeter member of near-circular arc form comprises a substantially rigid lower perimeter member of approximately circular arc form, which substantially rigid lower perimeter member of approximately circular arc form is structurally connected at its upper ends to the lower ends of a substantially rigid upper perimeter member of approximately circular arc form, such that together they form a substantially rigid ring that surrounds an inflatable contiguous volume that includes both said lower inflatable volume and said upper inflatable volume; and wherein said connecting support means connects to and supports and restrains said substantially rigid ring at least one of (i) vertically and (ii) laterally.

20. The low-cost heliostatic mirror of claim 19, further comprising:
loop means comprising at least one of a belt, a toothed belt, a belt with holes, a chain, and a concentric ring-bearing-connected member, that loops around both (a) the upper part of said substantially rigid ring and (b) at least one roller element connected to said rotatable base member; which loop means serves as at least one of (i) vertical restraint means for restraining said substantially rigid ring from upward vertical movement, and (ii) elevation control means for contributing to the elevation control part of said heliostatic control means.

* * * * *